(12) United States Patent
Mehta et al.

(10) Patent No.: US 11,583,756 B2
(45) Date of Patent: Feb. 21, 2023

(54) ELECTRONIC GAME BOARD

(71) Applicant: Infivention Technologies Pvt. Ltd., Mumbai (IN)

(72) Inventors: Atur Mayur Mehta, Mumbai (IN); Dhiraj Kaluram Gehlot, Ulhasnagar (IN); Bhavya Hitesh Gohil, Mumbai (IN)

(73) Assignee: INFIVENTION TECHNOLOGIES PVT. LTD., Mumbai (IN)

( * ) Notice: Subject to any disclaimer, the term of this patent is extended or adjusted under 35 U.S.C. 154(b) by 614 days.

(21) Appl. No.: 16/598,036

(22) Filed: Oct. 10, 2019

(65) Prior Publication Data
US 2020/0282297 A1   Sep. 10, 2020

Related U.S. Application Data

(60) Provisional application No. 62/815,515, filed on Mar. 8, 2019.

(51) Int. Cl.
*A63F 3/00* (2006.01)
*B25J 9/16* (2006.01)
(Continued)

(52) U.S. Cl.
CPC ........ *A63F 3/00643* (2013.01); *A63F 3/0052* (2013.01); *A63F 13/214* (2014.09);
(Continued)

(58) Field of Classification Search
CPC .................. A63F 13/214; A63F 13/218; A63F 2003/00662; A63F 2003/00684;
(Continued)

(56) References Cited

U.S. PATENT DOCUMENTS

| 4,398,720 A | 8/1983 | Jones et al. |
| 7,780,513 B2 * | 8/2010 | Lin ..................... A63F 3/00643 |
| | | 273/443 |

(Continued)

FOREIGN PATENT DOCUMENTS

| CN | 103978477 A | 8/2014 |
| CN | 106924961 A | 7/2017 |
| CN | 109760029 A | 5/2019 |

OTHER PUBLICATIONS

Michael Irving, "AI-enabled chess set moves virtual opponents on a real board", Nov. 17, 2016, New Atlas, available at << https://newatlas.com/square-off-ai-chess/46482/>>. (Year: 2016).*

(Continued)

*Primary Examiner* — Werner G Garner
(74) *Attorney, Agent, or Firm* — Chip Law Group

(57) ABSTRACT

An electronic game board that simulates moves of one or more players includes a top cover that includes a play area onto which game pieces are arranged for facilitating a game. The electronic game board further includes a drive system located beneath the top cover for simulating the moves on the play area by moving at least one game piece from a first position on the play area to a second position on the play area. The drive system includes a robotic arm and first and second actuators for controlling movement of the robotic arm. To simulate the move, the first and second actuators control the movement of the robotic arm such that the game piece is moved from the first position to the second position by way of the robotic arm.

5 Claims, 23 Drawing Sheets

(51) Int. Cl.
*A63F 13/218* (2014.01)
*A63F 13/214* (2014.01)

(52) U.S. Cl.
CPC ........... *A63F 13/218* (2014.09); *B25J 9/1664* (2013.01); *A63F 2003/0093* (2013.01); *A63F 2003/00662* (2013.01); *A63F 2003/00684* (2013.01)

(58) Field of Classification Search
CPC .......... A63F 2003/0093; A63F 3/00643; A63F 3/0052; B25J 9/1664
See application file for complete search history.

(56) References Cited

U.S. PATENT DOCUMENTS

| | | |
|---|---|---|
| 8,264,187 B2 | 9/2012 | Laceky et al. |
| 8,918,203 B2 | 12/2014 | Gilchrist et al. |
| 2008/0237983 A1 | 10/2008 | Chien |
| 2017/0120140 A1 | 5/2017 | Lee |
| 2018/0178113 A1 | 6/2018 | Knippen |

OTHER PUBLICATIONS

Screenshot of "What's inside a Magic Chess Board?" at 5:23, May 13, 2018, What's Inside, available at <<https://www.youtube.com/watch?v=dWttEUMFXH4>>. (Year: 2018).*

* cited by examiner

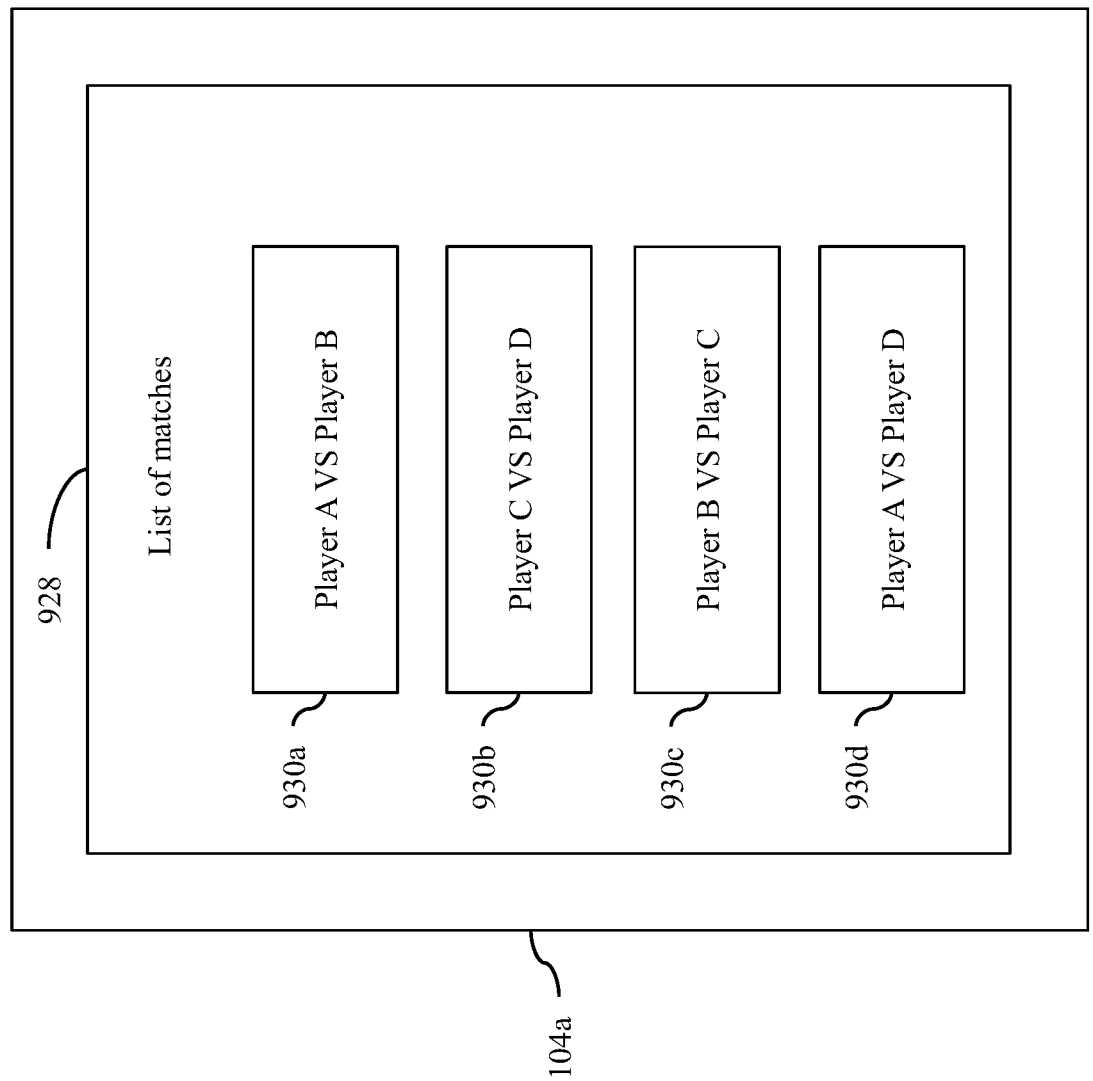

ELECTRONIC GAME BOARD

CROSS-RELATED APPLICATIONS

This application claims priority to U.S. Provisional Application Ser. No. 62/815,515, filed Mar. 8, 2019 and entitled "ELECTRONIC GAME BOARD", the contents of which are incorporated herein by reference.

FIELD

The disclosure relates generally to game boards, and, more particularly, to an electronic game board capable of simulating moves of one or more players.

BACKGROUND

Board games, such as snakes and ladders, chess, go, connect 4, checkers, and ludo, have been played by people of all ages and diversities for several generations. The board games may be played on any physical board, such as a wooden board, or on a computer. When a first player opts to play the board game on a physical board, the first player gets an opportunity to merely play with players that are in the vicinity of the first player. To play with players that are located remotely with respect to the first player, the first player has to rely on the computer.

In the last decade, electronic game boards have become popular owing to the opportunity to play with the remote players on a physical board. The first player thus gets an opportunity to play a board game on a physical board with a second player that is located remotely. Such electronic game boards include a gaming system that controls the operation of the electronic game boards. Thus, when the first player makes a move, the gaming system records the move, communicates the move to the second player, receives a counter move played by the second player, and displays the counter move on a screen of the electronic game board or on a player device of the first player. The first player then moves a game piece of the second player based on the counter move. While this approach provides the first player with a physical experience of playing the game with a remotely located player, it is quite tiresome for the first player to move the game pieces for the second player.

Thus, it would be advantageous to have an electronic game board that enables a player to play with an opponent, who is at a remote location, on a physical board without the need to move the game pieces for the opponent.

BRIEF DESCRIPTION OF THE DRAWINGS

The following detailed description of the preferred embodiments of the disclosure will be better understood when read in conjunction with the appended drawings. The disclosure is illustrated by way of example, and not limited by the accompanying figures, in which like references indicate similar elements.

FIG. 9E illustrates a fifth UI rendered on the first player device, in accordance with an embodiment of the disclosure;

DETAILED DESCRIPTION

Figure 1:
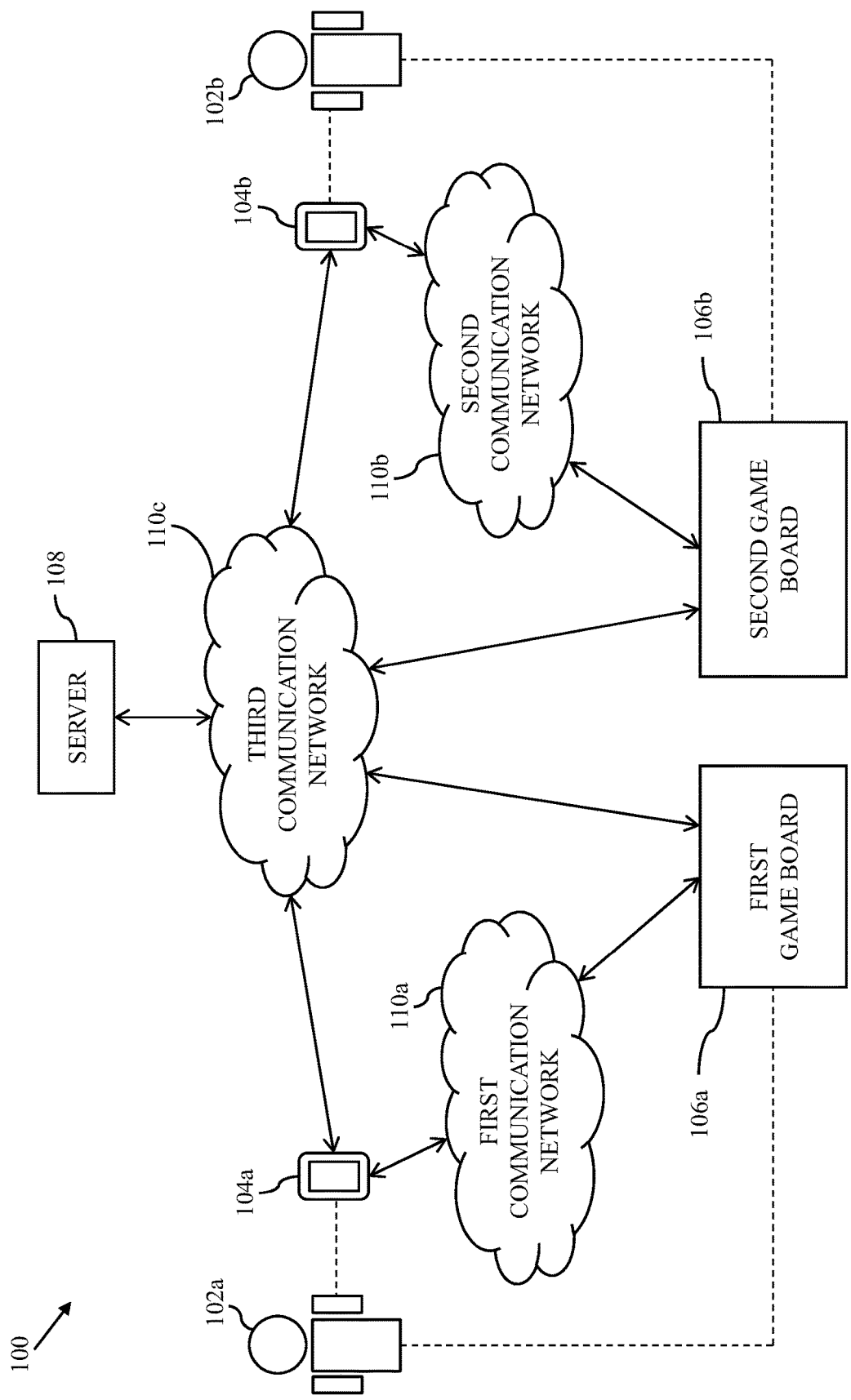
FIG. 1 is a block diagram that illustrates an environment in which various embodiments of the disclosure are practiced.

The detailed description of the appended drawings is intended as a description of the currently preferred embodiments of the disclosure, and is not intended to represent the only form in which the disclosure may be practiced. It is to be understood that the same or equivalent functions may be accomplished by different embodiments that are intended to be encompassed within the spirit and scope of the disclosure.

In one embodiment of the disclosure, a game board is provided. The game board includes a top cover and a drive system located beneath the top cover. The top cover includes at least a play area onto which multiple game pieces are arranged for facilitating a game. The drive system simulates a move on the play area by moving at least one game piece from a first position on the play area to a second position on the play area. The drive system includes a robotic arm and first and second actuators for controlling movement of the robotic arm. To simulate the move, the first and second actuators control the movement of the robotic arm such that the game piece is moved from the first position to the second position by way of the robotic arm.

In another embodiment of the disclosure, a game board is provided. The game board includes a top cover and a drive system located beneath the top cover. The top cover includes at least a play area onto which multiple game pieces are arranged for facilitating a game. The drive system simulates a move on the play area by moving at least one game piece from a first position on the play area to a second position on the play area. The drive system includes first and second shafts that are parallel to and spaced apart from each other, and first and second mounts that are slidably attached to the first and second shafts, respectively. The drive system further includes a third shaft fixedly attached to the first and second mounts such that the third shaft is perpendicular to the first and second shafts, and a robotic arm that is slidably attached to the third shaft. The robotic arm is slidable over the third shaft to move along a first axis, and the first and second mounts are slidable over the first and second shafts, respectively, to move the robotic arm along a second axis. The first axis is perpendicular to the second axis. The drive system further includes first and second actuators for controlling movement of the robotic arm by way of the first through third shafts and the first and second mounts. To simulate the move, the first and second actuators control the movement of the robotic arm along the first and second axes such that the game piece is moved from the first position to the second position by way of the robotic arm.

In yet another embodiment of the disclosure, a game board is provided. The game board includes a top cover and a drive system located beneath the top cover. The top cover includes at least a play area onto which multiple game pieces are arranged for facilitating a game. The drive system simulates a move on the play area by moving at least one game piece from a first position on the play area to a second position on the play area. The drive system includes a base and a robotic arm that includes first and second links. The first link is rotatably attached to the base, and the second link is rotatably attached to the first link. The drive system further includes first and second actuators for controlling movements of the first and second links, respectively, such that the first link is circularly rotatable with respect to the base, and the second link is circularly rotatable with respect to the first link. To simulate the move, the first and second actuators control the movements of the first and second links, respectively, such that the game piece is moved from the first position to the second position by way of the robotic arm.

Various embodiments of the disclosure provide a game board. The game board includes a top cover and a drive system located beneath the top cover. The top cover includes a play area onto which multiple game pieces are arranged for facilitating a game, and one or more parking areas onto which game pieces eliminated from the game are arranged. The game board further includes a processor that is configured to generate a set of control signals for simulating a move on the play area, and communicate the set of control signals to the drive system. The move corresponds to at least one of a move played by a player located remotely with respect to the game board, a move played by an artificial intelligence player, or a move associated with a match of the game. Based on the set of control signals, the drive system simulates the move on the play area by moving at least one game piece from a first position on the play area to a second position on the play area.

The drive system includes a robotic arm, and first and second actuators for controlling movement of the robotic arm. Based on the set of control signals, the first and second actuators control the movement of the robotic arm such that the game piece is moved from the first position to the second position by way of the robotic arm. The robotic arm includes a magnet for moving the game piece from the first position to the second position. The drive system thus simulates the move on the play area. The drive system similarly moves the eliminated game pieces from the play area to the corresponding parking areas.

The game board is thus capable of simulating moves of a player that is at a remote location as compared to the game board. Hence, a need for a player playing on the game board to move the game pieces for a remotely located player is eliminated. Thus, the player is able to play with the remotely located player and is also relieved of the tiresome activity of moving the game pieces for the opponent player.

FIG. 1 is a block diagram that illustrates an environment 100 in which various embodiments of the disclosure are practiced. The environment 100 includes first and second players 102a and 102b and first and second player devices 104a and 104b associated with the first and second players 102a and 102b, respectively. The environment 100 further includes first and second game boards 106a and 106b associated with the first and second players 102a and 102b, respectively, and a server 108. The first and second game boards 106a and 106b enable the first and second players 102a and 102b to play various board games. Examples of the board games include, but are not limited to, snakes and ladders, chess, go, connect 4, checkers, and ludo.

The first player device 104a is connected to the first game board 106a by way of a first communication network 110a. Similarly, the second player device 104b is connected to the second game board 106b by way of a second communication network 110b. The first player device 104a and the second player device 104b are connected to each other by way of a third communication network 110c. Additionally, the first and second game boards 106a and 106b may be connected to each other by way of the third communication network 110c. Further, the server 108 is connected to the first and second player devices 104a and 104b and the first and second game boards 106a and 106b by way of the third communication network 110c. Examples of the first through third communication networks 110a-110c include, but are not limited to, a Bluetooth network, a Bluetooth low energy (BLE) network, a wireless fidelity (Wi-Fi) network, a light fidelity (Li-Fi) network, a local area network (LAN), a wide area network (WAN), a metropolitan area network (MAN), a mobile network such as a cellular data network, a high-speed packet access (HSPA) network, a satellite network, the Internet, a fiber optic network, a coaxial cable network, an infrared (IR) network, a radio frequency (RF) network, and a combination thereof. For the sake of ongoing discussion and without deviating from the scope of the disclosure, it is assumed that the first and second communication networks 110a and 110b are one of BLE or Wi-Fi network, and the third communication network 110c is the Internet. Various entities in the environment 100 may connect to the first through third communication networks 110a-110c in accordance with various wired and wireless communication protocols, such as Transmission Control Protocol and Internet Protocol (TCP/IP), User Datagram Protocol (UDP), Long Term Evolution (LTE) communication protocols, or any combination thereof.

The first and second players 102a and 102b are individuals who are at different locations and wish to play a board game (such as chess). The first and second players 102a and 102b use the respective first and second player devices 104a and 104b to perform various activities. For example, the first player 102a uses the first player device 104a to initiate the board game. To initiate the board game, the first player 102a selects a game mode by way of the first player device 104a. Various modes of input used by the first player 102a to select the game mode may include, but are not limited to, a touch-based input, a text-based input, a voice-based input, a gesture-based input, or a combination thereof.

The selected game mode on the first player device 104a may be one of a first, second, or third game mode. In an embodiment, the first game mode is a 'Play with Friends' game mode, the second game mode is a 'Play with AI' game mode, and the third game mode is a 'Stream Games' game mode. The first player 102a may select the first game mode when the first player 102a wishes to play with another player who is at a different location as compared to the first player 102a (e.g., the second player 102b). The first player 102a may select the second game mode when the first player 102a wishes to play with an artificial intelligence (AI) player (e.g., a computer). Similarly, the first player 102a may select the third game mode when the first player 102a wishes to stream matches of various board games (i.e., ludo matches, checker matches, chess matches, and the like) that may be live or recorded.

Upon selection of the first, second, or third game mode, the first player 102a may be presented with various other options on the first player device 104a. For example, the first player 102a may be presented with an option to select a preferred set of game pieces (e.g., one of a black or a white set of game pieces) for playing the board game. Further, when the first player 102a selects the first game mode, the first player 102a may be presented with an option to select a difficulty level, from a set of difficulty levels, and an option to select an opponent player (such as the second player 102b) from a set of players available for playing the board game. In an embodiment, the set of players is identified randomly. In another embodiment, the set of players is identified based on the selected difficulty level. The first player 102a may further be presented with an option to search for a preferred opponent player based on a player identifier (ID) of the preferred opponent player known beforehand by the first player 102a. Similarly, when the first player 102a selects the second game mode, the first player 102a may be presented with the option to select the difficulty level for playing the board game. When the first player 102a selects the third game mode, the first player 102a may be presented with an option to select, from a set of available matches, a match for streaming. The second player 102b may similarly use the second player device 104b to initiate the board game.

The first player device 104a is a computing device that is used by the first player 102a to play the board game. The first player device 104a presents the first, second, and third game modes, by way of a first user interface (UI) (shown in FIG. 9A), to the first player 102a for selection. In an embodiment, the first UI is rendered on the first player device 104a by a service application installed on the first player device 104a. In another embodiment, the first UI is rendered on the first player device 104a by the server 108. In addition to presenting the first through third game modes for selection, the first player device 104a sequentially presents, to the first player 102a, various UIs that are rendered by the server 108 or the service application. For example, the first player device 104a may present a second UI (shown in FIG. 9B) for enabling selection of the difficulty level for the board game. The first player device 104a may further present a third UI (shown in FIG. 9C) for enabling selection of the opponent player for playing the board game. The opponent player may be selected from the set of available players for playing the board game or by searching for the preferred opponent player based on the player ID. Further, the first player device 104a may present a fourth UI (shown in FIG. 9D) that includes the option to select a preferred set of game pieces for playing the board game. Additionally, the first player device 104a may present a fifth UI (shown in FIG. 9E) for enabling selection of the match for streaming from the set of available matches. The set of available matches may include various live and recorded matches. The first player device 104a may further present a sixth UI (shown in FIG. 9F) displaying various board settings of the first game board 106a.

The first player device 104a receives, from the first game board 106a over the first communication network 110a, a first move (i.e., information associated with the first move) played by the first player 102a on the first game board 106a. When the board game is played in the first game mode, the first player device 104a transmits the first move to the second player device 104b over the third communication network 110c. The second player 102b may play the board game on the second game board 106b or the second player device 104b. When the second player 102b plays the board game on the second game board 106b, the second player device 104b transmits the first move to the second game board 106b over the second communication network 110b. The first move is then simulated on the second game board 106b. The second player device 104b receives a counter move (i.e., information associated with the counter move) from the second game board 106b. The counter move is a move played by the second player 102b on the second game board 106b in response to the first move. When the second player 102b plays the board game on the second player device 104b, the first move is displayed to the second player 102b on the second player device 104b. Further, in response to the first move, the second player 102b plays the counter move on the second player device 104b. The second player device 104b further transmits the counter move to the first player device 104a over the third communication network 110c. The first player device 104a transmits the received counter move to the first game board 106a, over the first communication network 110a. The counter move is then simulated on the first game board 106a.

When the board game is played in the second game mode, the first player device 104a may generate the counter move. In an embodiment, the service application installed on the first player device 104a may include an AI engine that analyzes the first move played by the first player 102a and in response, generates the counter move. Thus, when the selected game mode is the second game mode, the AI engine acts as the opponent player (i.e., the AI player). In an embodiment when the board game is chess, the AI engine corresponds to a chess engine. Examples of the chess engine includes 'Stockfish™', 'Alphazero™', and the like. The first player device 104a transmits the generated counter move to the first game board 106a. The counter move is then simulated on the first game board 106a.

When the board game is played in the third game mode, the first player device 104a sequentially receives, from the server 108, a set of moves played during the selected match. The first player device 104a sequentially transmits the set of moves to the first game board 106a. The set of moves are sequentially simulated on the first game board 106a. The first player device 104a may further present game information including moves played by players (such as the first and second players 102a and 102b), various board settings of the first game board 106a, current status of the game, and the like, to the first player 102*a*. Various functionalities and operations of the second player device 104*b* are similar to functionalities and operations of the first player device 104*a* as described above. Examples of the first and second player devices 104*a* and 104*b* include, but are not limited to, a personal computer, a laptop, a smartphone, a phablet, and a tablet computer.

The first game board 106*a* is a telerobotic game board (i.e., an electronic game board) that is capable of moving a game piece using a drive system (shown in FIGS. 3, 4A, 4B, 7A, 7B, 8A, and 8B). When the first player 102*a* plays the first move, the first game board 106*a* records the first move. In an embodiment, the first game board 106*a* communicates the first move to the first player device 104*a* by way of the first communication network 110*a*. In another embodiment, the first game board 106*a* communicates the first move to the server 108 by way of the third communication network 110*c*. In yet another embodiment, the first game board 106*a* communicates the first move to the second game board 106*b* by way of the third communication network 110*c*. Further, the first game board 106*a* receives the counter move from one of the first player device 104*a*, the server 108, or the second game board 106*b*. The first game board 106*a* simulates the counter move, played by either the second player 102*b* or the AI player, by moving a corresponding game piece using the drive system. Additionally, the first game board 106*a* may receive the set of moves associated with the selected match from the first player device 104*a* or from the server 108, and sequentially simulate the set of moves.

The first game board 106*a* includes two or more sets of game pieces. In an embodiment when the board game is chess, the first game board 106*a* is a chessboard and includes two sets of game pieces such as a black set of game pieces and a white set of game pieces, each of which includes 16 game pieces used for playing chess. Further, each of the black and white set of game pieces may include additional game pieces, such as additional queens, additional rooks, additional bishops, additional knights, and the like. In an embodiment, each game piece includes a magnet (e.g., a neodymium magnet) at a bottom part of the game piece.

The first game board 106*a* may further include the AI engine. The second game board 106*b* is structurally similar to the first game board 106*a*. Further, various functionalities and operations of the second game board 106*b* are similar to functionalities and operations of the first game board 106*a* as described above. The first game board 106*a* is explained in detail in conjunction with FIGS. 2-8.

The server 108 may include suitable logic, circuitry, interfaces, and/or code, executable by the circuitry, that may be configured to perform one or more operations for playing the board game. The server 108 is a computing device, a software framework, or a combination thereof, that may provide a generalized approach to create the server implementation. In an embodiment, various operations of the server 108 may be dedicated to execution of procedures, such as, but not limited to, programs, routines, or scripts stored in a server memory (not shown) for supporting its applied applications. The server 108 renders various UIs (such as the first through sixth UIs) on the first and second player devices 104*a* and 104*b* presenting various options for user selection such as the first through third game modes, the set of difficulty levels, and the like.

The server 108 receives the first move played by the first player 102*a* by way of the first game board 106*a*. When the board game is played in the second game mode, the server 108 may include the AI engine to generate the counter move. The server 108 further transmits the counter move to the first game board 106*a*. Thus, when the board game is played in the second game mode, the server 108 acts as the opponent player (i.e., the AI player).

The server 108 may be connected to a third-party server (not shown) for receiving information (i.e., moves played) associated with various live or recorded matches. Alternatively, the information associated with the various recorded matches may be stored in the server memory associated with the server 108. When the board game is played in the third game mode, the server 108 sequentially transmits the set of moves that are played in the selected match to the first game board 106*a*. The server 108 may be realized through various web-based technologies, such as, but not limited to, a Java web-framework, a .NET framework, a PHP framework, a python framework, or any other web-application framework. Examples of the server 108 include, but are not limited to, a personal computer, a laptop, or a network of computer systems.

In operation, the first player 102*a* wishes to play the board game on the first game board 106*a*. For the sake of ongoing discussion, it is assumed that the board game is chess. However, it will be apparent to a person having ordinary skill in the art that the scope of the disclosure is not limited to chess. In various other embodiments of the disclosure, various board games may be played using the game board (such as the first and second game boards 106*a* and 106*b*) of the disclosure.

The first player device 104*a* is connected to the first game board 106*a* by way of the first communication network 110*a*. Further, the first UI is rendered on the first player device 104*a* that presents the options of the game modes to the first player 102*a* for selection. In an embodiment, the service application installed on the first player device 104*a* renders the first UI. In another embodiment, the server 108 renders the first UI. For the sake of ongoing discussion, it is assumed that the service application renders the first UI on the first player device 104*a*.

When the first player 102*a* selects the first game mode, i.e., the 'Play with Friends' game mode, the service application renders the second UI on the first player device 104*a* presenting the set of difficulty levels to the first player 102*a* for selection. The service application further renders the third UI presenting the set of players to the first player 102*a* for selection. The set of players presented on the third UI may be identified randomly or based on the selected difficulty level. The first player 102*a* may further be presented with the option to search for the preferred opponent player based on the corresponding player ID. In an example, the first player 102*a* selects the second player 102*b*, from the set of players, for playing the board game. The service application further renders the fourth UI on the first player device 104*a* presenting the option for playing with the black or white set of game pieces. If the first player 102*a* selects to play with the white set of game pieces, the first player 102*a* starts the board game. If the first player 102*a* selects to play with the black set of game pieces, the second player 102*b* starts the board game. In an example, the first player 102*a* selects the white set of game pieces.

The first player 102*a* plays the first move (i.e., moves a 'white' game piece) on the first game board 106*a*. In an embodiment, the first game board 106*a* records the first move and communicates the first move to the first player device 104*a* over the first communication network 110*a*. The first player device 104*a* analyzes the first move to determine if the first move is a valid move. If the first move is a valid move, the first player device 104*a* transmits the first move to the second player device 104*b* over the third communication network 110c. If the first move is an invalid move, the first player device 104a does not transmit the invalid move to the second player device 104b, and notifies the first player 102a of the invalid move by way of a buzzer (shown in FIG. 3). When the second player 102b plays the board game on the second game board 106b, the second player device 104b communicates the first move (i.e., the valid first move) to the second game board 106b over the second communication network 110b. The second game board 106b moves a corresponding 'white' game piece, using the drive system, from one position to another position based on the first move. In response to the first move simulated on the second game board 106b, the second player 102b plays the counter move (i.e., moves a 'black' game piece) on the second game board 106b. The second game board 106b transmits the counter move to the first game board 106a by way of the second and first player devices 104b and 104a. When the second player 102b plays the board game on the second player device 104b, the first move is displayed to the second player 102b on the second player device 104b. In response to the first move displayed on the second player device 104b, the second player 102b plays the counter move on the second player device 104b. The second player device 104b transmits the counter move to the first game board 106a by way of the first player device 104a.

In another embodiment, when the first player 102a plays the first move, the first game board 106a records the first move. The first game board 106a analyzes the first move to determine if the first move is a valid move. If the first move is a valid move, the first game board 106a transmits it to the second game board 106b over the third communication network 110c. If the first move is an invalid move, the first game board 106a does not transmit the invalid move to the second game board 106b, and notifies the first player 102a by way of the buzzer. The second game board 106b moves the corresponding 'white' game piece, using the drive system, from one position to another position based on the first move. In response to the first move simulated on the second game board 106b, the second player 102b plays the counter move on the second game board 106b. The second game board 106b transmits the counter move to the first game board 106a by way of the third communication network 110c.

The first game board 106a moves a corresponding 'black' game piece from one position to another position based on the counter move. Thus, the first and second players 102a and 102b located at different locations are able to play the board game together. It will be apparent to a person skilled in the art that when the first player 102a selects the black set of game pieces, the second player 102b plays the first move. Further, the game piece of the second player 102b (i.e., the corresponding 'white' game piece) is moved from one position to another position on the first game board 106a, to display the first move to the first player 102a.

When the first player 102a selects the second game mode, i.e., the 'Play with AI' game mode, the service application further renders the second UI on the first player device 104a presenting the set of difficulty levels to the first player 102a for selection. In an embodiment, a skill level of the AI player as the opponent player is based on the difficulty level selected by the first player 102a. In another embodiment, the skill level of the AI player is adaptive based on a skill level of the first player 102a. In an embodiment, the AI player corresponds to the AI engine included in the service application installed on the first player device 104a. In another embodiment, the AI player corresponds to the AI engine included in the server 108. In yet another embodiment, the AI player corresponds to the AI engine included in the first game board 106a. Further, the service application renders the fourth UI on the first player device 104a presenting options for playing with one of the black or the white set of game pieces. In an example, the first player 102a selects the white set of game pieces.

The first player 102a plays the first move (i.e., moves the 'white' game piece) on the first game board 106a. In an embodiment, the first game board 106a records the first move and transmits the first move to the first player device 104a by way of the first communication network 110a. The AI player on the first player device 104a analyzes the first move and generates the counter move based on the analysis of the first move. The first player device 104a transmits the counter move to the first game board 106a by way of the first communication network 110a. The first game board 106a moves the corresponding 'black' game piece, using the drive system, from one position to another position based on the counter move. In another embodiment, when the first player 102a plays the first move, the first game board 106a records the first move and transmits it to the server 108 by way of the third communication network 110c. The AI player on the server 108 analyzes the first move and generates the counter move based on the analysis of the first move. The server 108 transmits the counter move to the first game board 106a by way of the third communication network 110c. The first game board 106a moves the 'black' game piece from one position to another position using the drive system based on the counter move. In yet another embodiment, when the first player 102a plays the first move, the first game board 106a records the first move and the AI player on the first game board 106a analyzes the first move. The AI player on the first game board 106a generates the counter move based on the analysis of the first move. The first game board 106a moves the 'black' game piece from one position to another position based on the counter move. Thus, the first player 102a is able to play the board game at various difficulty levels with the AI player.

When the first player 102a selects the third game mode, i.e., the 'Stream Games' game mode, the service application renders the fifth UI on the first player device 104a presenting the set of available matches (i.e., the various live and recorded matches) to the first player 102a for selection. The first player 102a selects the match (i.e., a chess match) from the set of available matches for streaming. The selection of the match by the first player 102a is communicated to the server 108 by the first player device 104a by way of the third communication network 110c. In an embodiment, the server 108 transmits the set of moves associated with the selected match to the first player device 104a by way of the third communication network 110c. The first player device 104a further transmits the set of moves to the first game board 106a by way of the first communication network 110a. In another embodiment, the server 108 transmits the set of moves to the first game board 106a over the third communication network 110c. Alternatively, the information associated with the various recorded matches may be stored in a device memory (not shown) of the first player device 104a. Thus, when the first player 102a selects the recorded match for streaming, the first player device 104a transmits the set of moves associated with the recorded match to the first game board 106a by way of the first communication network 110a. The first game board 106a sequentially moves various game pieces, using the drive system, from one position to another position based on the set of moves. Thus, the first player 102a is able to view the selected match on the first game board 106a.

Figure 2A:
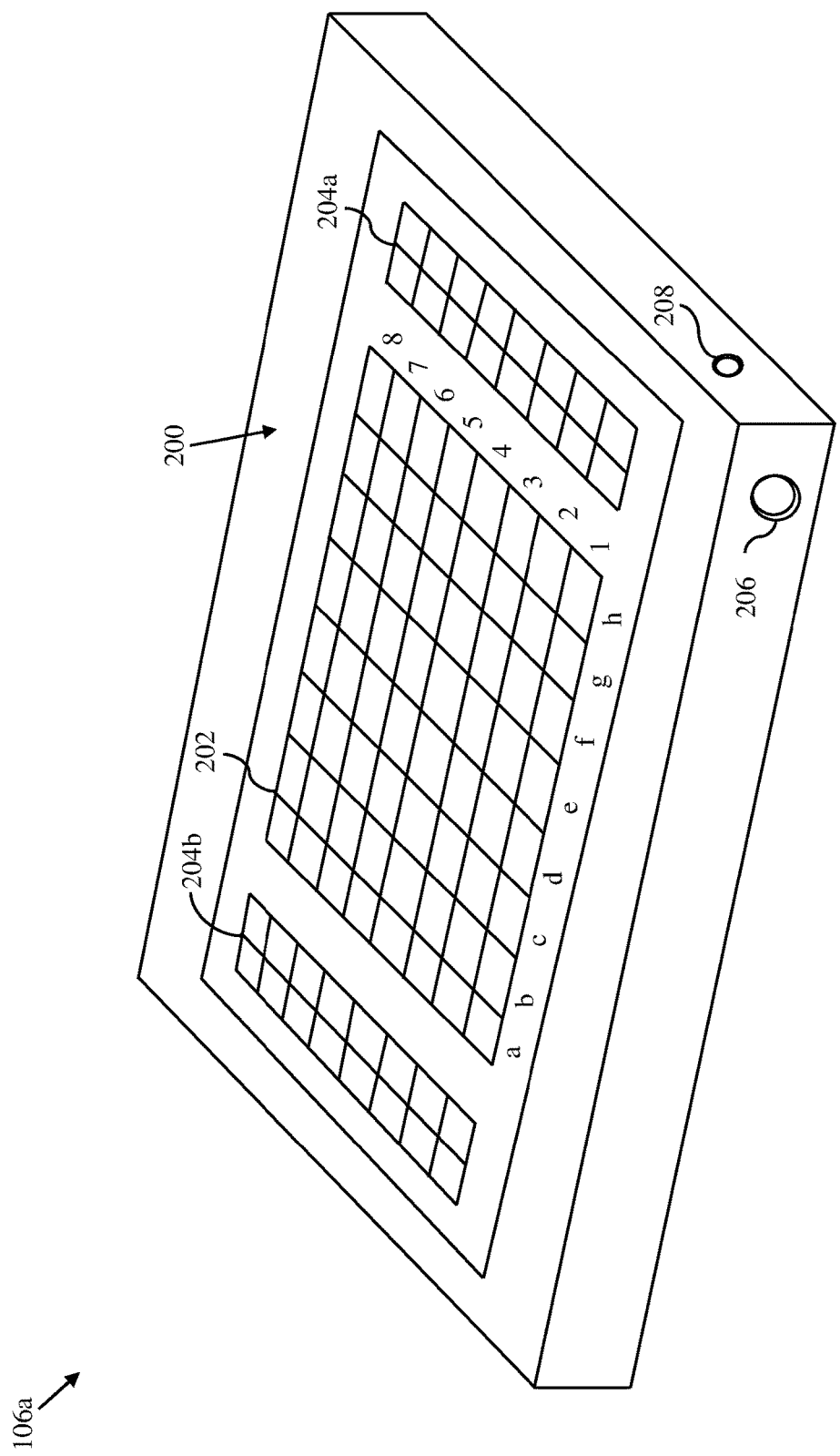
FIG. 2A illustrates a first game board of the environment of FIG. 1, in accordance with an embodiment of the disclosure.

FIG. 2A illustrates the first game board 106a, in accordance with an embodiment of the disclosure. The first game board 106a includes a top cover 200. The top cover 200 includes a play area 202 and first and second parking areas 204a and 204b. In an embodiment, the play area 202 and the first and second parking areas 204a and 204b are detachably attached to the top cover 200. The top cover 200 may be made out of materials such as glass, plastic, wood, metal, fiber, and the like. In an example, the top cover 200 is made out of medium density fiber with a rosewood finish. The top cover 200 further includes a switch 206 and a power connector 208. The first game board 106a further includes a gaming system (shown in FIG. 3) for simulating movements of the black and white sets of game pieces (interchangeably referred to as, "game pieces").

The play area 202 is an 8×8 grid of 64 squares onto which the game pieces are arranged. Eight rows of the 8×8 grid are denoted with numbers '1' to '8'. Similarly, eight columns of the 8×8 grid are denoted with letters 'a' to 'h'. Each square of the 64 squares is uniquely identified based on a number of the row and a letter of the column. For example, a square corresponding to a first row and a first column is denoted as 'a1'. Each of the black and white sets of game pieces includes 16 game pieces and are placed on two rows on each end of the play area 202 (such as row '1' and row '2' for the white set of game pieces, and row '7' and row '8' for the black set of game pieces) at the initiation of the board game.

The first and second parking areas 204a and 204b have 16 spaces each, i.e., one space for arranging one of the 16 game pieces of the black and white sets of game pieces. In an embodiment, the first parking area 204a is for the black set of game pieces, and the second parking area 204b is for the white set of game pieces. In another embodiment, the first parking area 204a is for the white set of game pieces, and the second parking area 204b is for the black set of game pieces. While playing the board game, if a game piece at a first position is captured by another game piece that comes from a second position, the captured game piece is moved to a corresponding allotted space in the first or second parking area 204a or 204b, using the drive system. For example, when a 'black rook' is captured and removed from game, the 'black rook' is moved to a space allotted to the 'black rook' in the first parking area 204a. Similarly, when a 'white knight' is captured and removed from game, the 'white knight' is moved to a space allotted to the 'white knight' in the second parking area 204b. Further, the capturing game piece is moved from the second position to the first position using the drive system. Additionally, a game piece positioned at a corresponding allotted space in the first or second parking area 204a or 204b may be moved to the play area 202, using the drive system. For example, when 'a black pawn' reaches a row on the opposite end of the play area 202 (i.e., row '1'), the 'black pawn' is moved to an allotted space in the first parking area 204a and a 'black queen' positioned at a corresponding allotted space in the first parking area 204a is moved to the position of the 'black pawn' on the play area 202, using the drive system. Further, when the game ends, the black and white sets of game pieces are moved, using the drive system, to their initial positions from their respective allotted spaces in the first and second parking areas 204a and 204b based on an auto-reset command initiated by the first player 102a. The first player 102a may initiate the auto-reset command by way of the first player device 104a or an auto-reset button (not shown) included in the first game board 106a.

The switch 206 is a mechanical switch used to switch ON or switch OFF the first game board 106a. When the switch 206 is closed, the first game board 106a is switched ON. When the switch 206 is open, the first game board 106a is switched OFF. In an embodiment, the switch 206 includes a light emitting diode (LED) (not shown) for indicating whether the first game board 106a is switched ON or switched OFF. The LED may further indicate the selected game mode. In an example, when the first through third game modes are selected, the LED operates at first through third speeds, respectively. In another example, the LED is a red-green-blue LED with red, green, and blue colors indicating the first, second, and third game modes, respectively. Examples of the switch 206 include a single pole single throw switch, a toggle switch, a push button switch, and the like. The power connector 208 is used to connect an external power supply circuit (not shown) to the first game board 106a for supplying power. The external power supply circuit may supply a direct current (DC) power or an alternating current (AC) power.

Figure 2B:
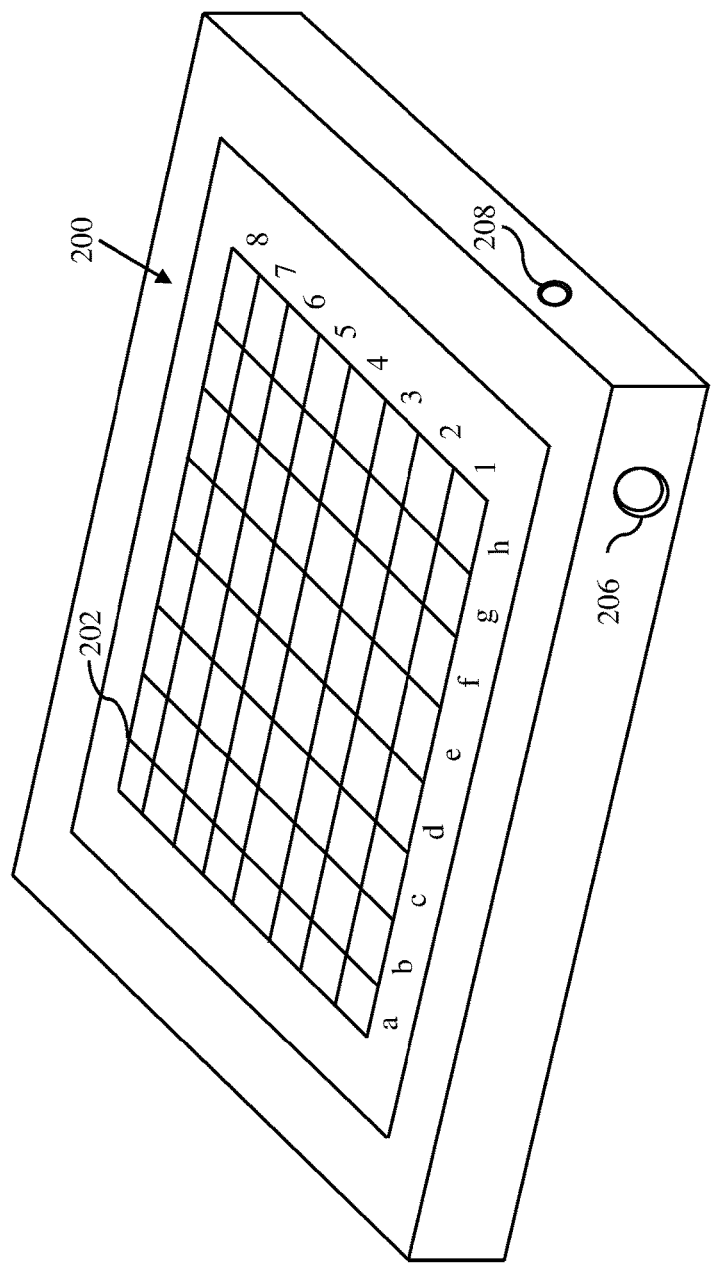
FIG. 2B illustrates the first game board, in accordance with another embodiment of the disclosure.

FIG. 2B illustrates the first game board 106a, in accordance with another embodiment of the disclosure. The first and second parking areas 204a and 204b are absent in the first game board 106a illustrated in FIG. 2B. Thus, while playing the board game, if a game piece is captured and removed from the game, the game piece is moved to a boundary of the play area 202 using the drive system. Alternatively, while playing the board game, if the game piece is captured and removed from the game, the game piece is popped up on the play area 202 using the drive system. The first player 102a then removes the game piece from the play area 202. Further, when the game ends, the first player 102a manually moves all the game pieces (i.e., the black and white sets of game pieces) to their initial positions.

Figure 2C:
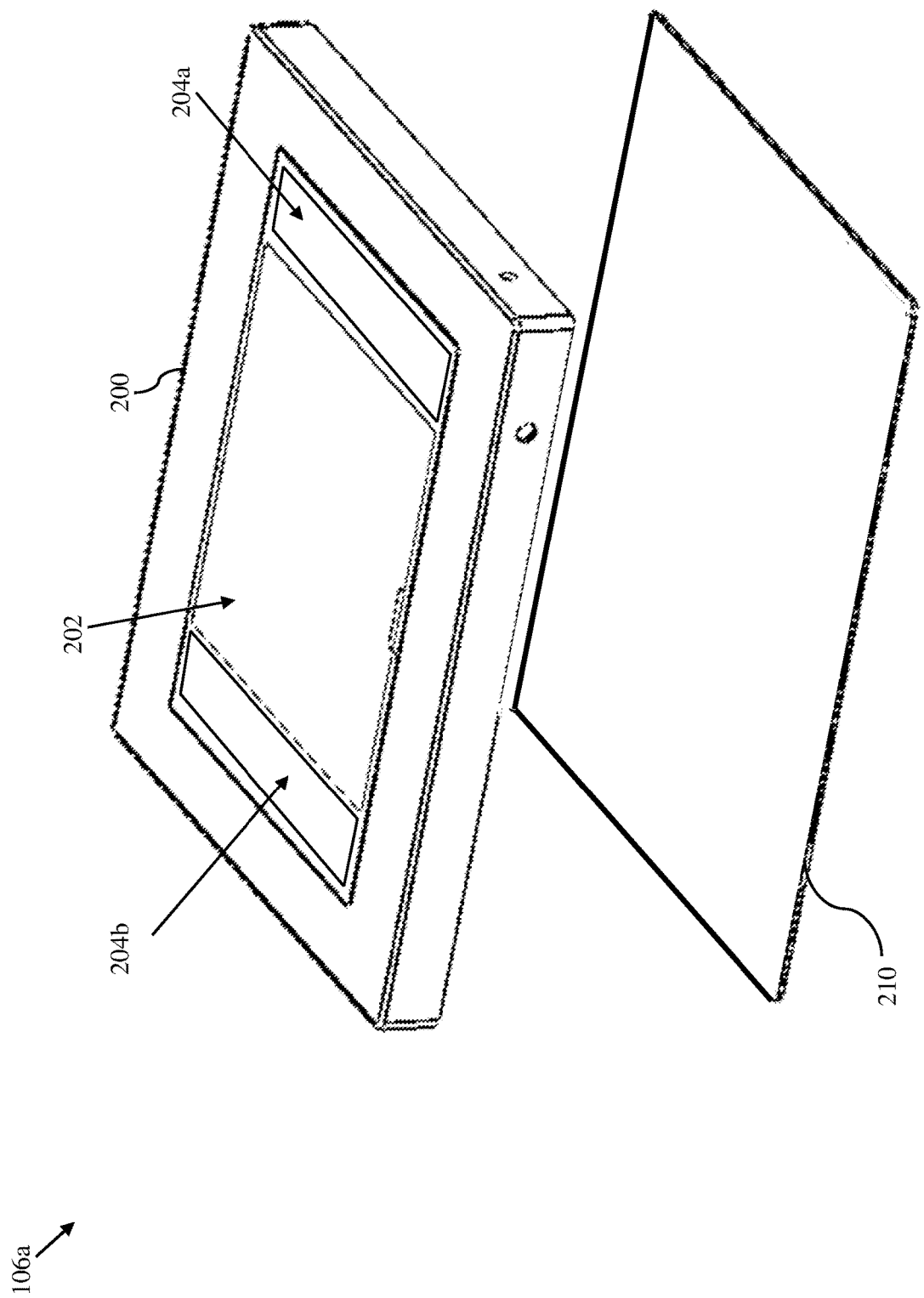
FIG. 2C illustrates the first game board with a top cover detached from a bottom support thereof, in accordance with an embodiment of the disclosure.

FIG. 2C illustrates the first game board 106a with the top cover 200 detached from a bottom support 210 thereof, in accordance with an embodiment of the disclosure. As illustrated in FIG. 2C, the top cover 200 includes the play area 202 and the first and second parking areas 204a and 204b. The top cover 200 and the bottom support 210 when assembled together form the first game board 106a as illustrated in FIG. 2A. The bottom support 210 includes various electronic and mechanical components (shown in FIGS. 3-8), including the gaming system, mounted thereon.

Figure 2D:
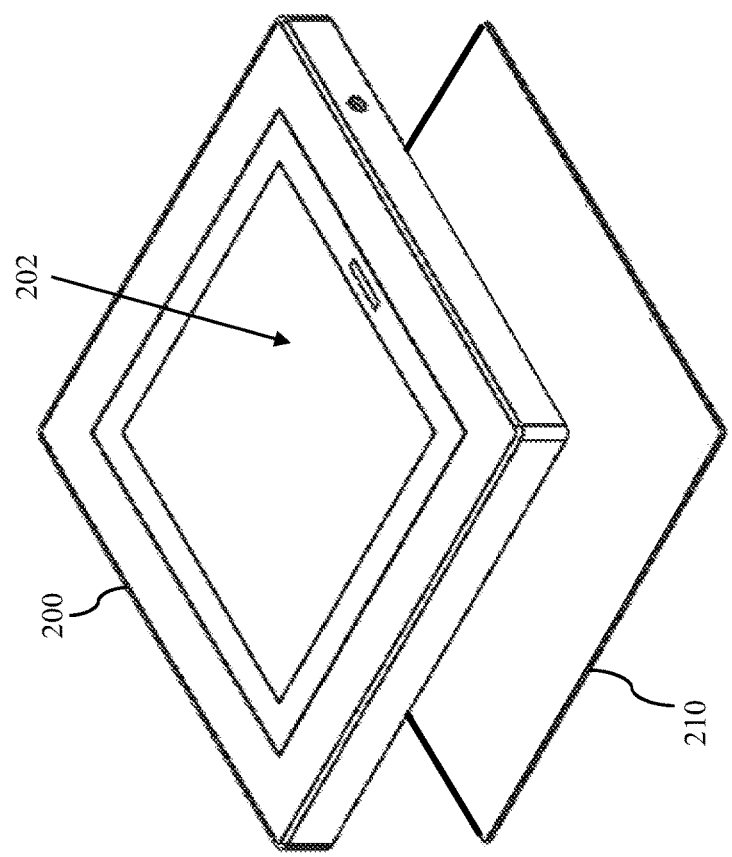
FIG. 2D illustrates the first game board with the top cover detached from the bottom support thereof, in accordance with another embodiment of the disclosure.

FIG. 2D illustrates the first game board 106a with the top cover 200 detached from the bottom support 210 thereof, in accordance with another embodiment of the disclosure. As illustrated in FIG. 2D, the top cover 200 includes the play area 202. The top cover 200 and the bottom support 210 when assembled together form the first game board 106a as illustrated in FIG. 2B.

Figure 3:
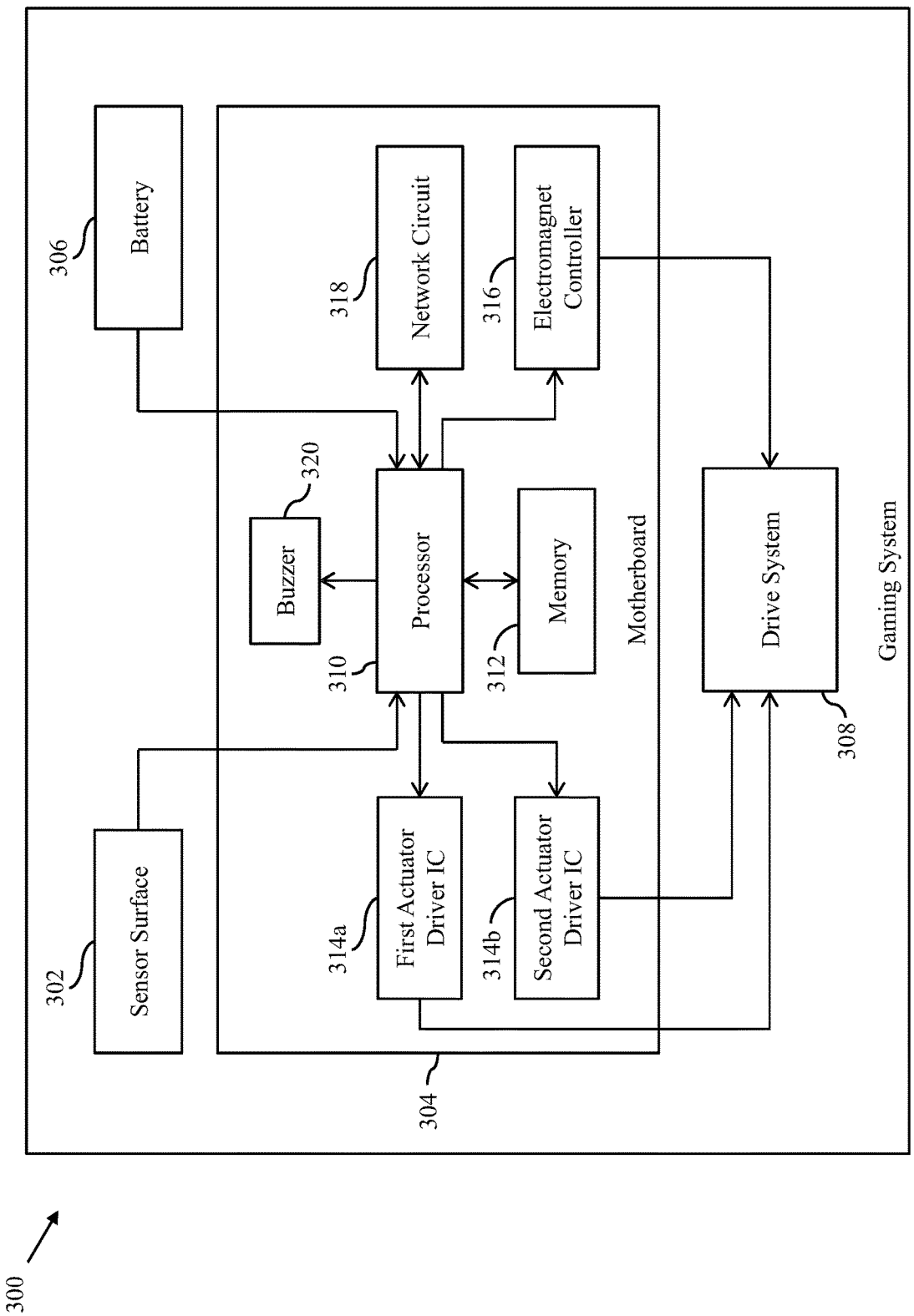
FIG. 3 is a block diagram that illustrates a gaming system of the first game board, in accordance with an embodiment of the disclosure.

FIG. 3 is a block diagram that illustrates the gaming system 300 of the first game board 106a, in accordance with an embodiment of the disclosure. The gaming system 300 is embedded within the first game board 106a. The gaming system 300 includes a sensor surface 302, a motherboard 304, a battery 306, and the drive system 308.

The sensor surface 302 determines positions and movements of the game pieces (i.e., the black and white sets of game pieces). In an embodiment, the sensor surface 302 is placed beneath the play area 202 and the first and second parking areas 204a and 204b. In another embodiment, the sensor surface 302 corresponds to the play area 202 and the first and second parking areas 204a and 204b.

The sensor surface 302 is implemented in any suitable manner to determine the positions and the movements of the game pieces. In an embodiment, the sensor surface 302 is a keypad matrix. The keypad matrix is a keyboard in which switches are connected by a grid of wires. For example, 16 wires arranged in 8 rows and 8 columns connect 64 switches such that each switch corresponds to one square from the 64 squares of the 8×8 grid. The first player 102a, when playing the first move, presses a game piece on the sensor surface 302 at a start position and an end position, such that the respective switches of the keyboard are activated, to enable the motherboard 304 to record the first move. In another embodiment, the sensor surface 302 is an inductive surface that includes a number of elongated transmit and receive coils (not shown) arranged in a manner such that a portion of both the transmit and receive coils are located beneath each square of the play area 202 and the first and second parking areas 204a and 204b. When a transmit coil and a receive coil is selected, a resonance occurs due to the induction between the transmit coil and the receive coil. Further, each game piece includes a resonance coil (not shown). As a game piece with the resonance coil is located directly above the intersecting part of the transmit coil and the receive coil, the resonance coil of the game piece changes the resonance. The change in resonance results in a fixed resonance frequency that uniquely identifies the game piece. Further, the position and the movement of the game pieces are determined based on the change in resonance.

In yet another embodiment, the sensor surface 302 includes a hall sensor (not shown) beneath each square of the play area 202 and the first and second parking areas 204a and 204b. The sensor surface 302 further includes one or more multiplexers that are connected to the hall sensors such that each multiplexer is connected to two or more hall sensors. The hall sensors are activated when a game piece is slid over the play area 202. Thus, the position and the movement of the game pieces are determined based on the activation of the hall sensors. In yet another embodiment, the sensor surface 302 includes a reed switch (not shown) beneath each square of the 8×8 grid and the first and second parking areas 204a and 204b, and the game pieces include magnets (not shown). The reed switches are activated by the magnets in the game pieces. Thus, the position and the movement of the game pieces is determined based on the activation of the reed switches. In yet another embodiment, the sensor surface 302 includes a color sensor (not shown) or a photodetector integrated circuit (not shown) beneath each square of the play area 202 and the first and second parking areas 204a and 204b. Further, a bottom part of each game piece includes a colored or a gray scale identifier (not shown) for uniquely identifying each game piece. In addition, the position and the movement of the game pieces are determined based on the colored or the gray scale identifier. In yet another embodiment, the sensor surface 302 includes two or more electrical contacts beneath each square of the play area 202 and the first and second parking areas 204a and 204b, and each game piece includes a resistor (not shown) of a predetermined resistance for uniquely identifying each game piece. Further, the position and the movement of the game pieces are determined based on resistances of each square.

In yet another embodiment, the sensor surface 302 includes an antenna (not shown) beneath each square of the play area 202 and the first and second parking areas 204a and 204b. The sensor surface 302 further includes one or more NFC readers connected to the antennas such that each NFC reader is connected to two or more antennas. Further, each game piece includes the NFC tag for uniquely identifying each game piece. The position and the movement of the game pieces are determined using the NFC tag. In yet another embodiment, the sensor surface 302 includes a capacitive touch sensor (not shown) beneath each square of the play area 202 and the first and second parking areas 204a and 204b. The position and the movement of each game piece is determined based on a contact between a game piece and a capacitive touch sensor. In yet another embodiment, the sensor surface 302 is a screen that includes multiple LEDs (not shown) along a first edge of the screen and a line sensor (not shown) along a second or an opposite edge of the screen such that the light rays from the multiple LEDs are incident on the line sensor. When a game piece is placed between the multiple LEDs and the line sensor, the position of the game piece is determined based on a shadow of the game piece cast on the line sensor. Additionally, the screen may include an NFC surface, and each game piece may include the NFC tag that uniquely identifies each game piece. In yet another embodiment, the sensor surface 302 corresponds to a touch screen. When a game piece is moved on the touch screen, the touch screen records touch positions of the game piece on the touch screen. The movement of the game piece is determined based on the recorded touch positions. The touch screen may be a resistive touch screen, a capacitive touch screen, a surface acoustic wave touch screen, an optical touch screen, or the like. The touch screen may further include the NFC surface along the edges, and each game piece may include the NFC tag that uniquely identifies the game piece. Additionally, the touch screen may be a graphic display that displays the 8×8 grid of the play area 202 and the 16 spaces each of the first and second parking areas 204a and 204b.

The motherboard 304 is connected to the sensor surface 302 for receiving the positions and the movements of the game pieces. The motherboard 304 includes a processor 310, a memory 312, first and second actuator driver integrated circuits (ICs) 314a and 314b, an electromagnet controller 316, a network circuit 318, and a buzzer 320.

The processor 310 includes suitable logic, circuitry, and/or interfaces that are operable to execute one or more instructions stored in the memory 312 to perform one or more operations. The processor 310 is connected to the sensor surface 302 for receiving the positions and the movements of the game pieces (i.e., the moves played by the first player 102a such as the first move). The processor 310 transmits the moves of the first player 102a to the first player device 104a, the server 108, or the second game board 106b, by way of the network circuit 318. Similarly, the processor 310 receives the moves of the second player 102b, the AI player, or the selected match by way of the network circuit 318. Based on the received moves, the processor 310 controls the positions and the movements of the game pieces on the first game board 106a. The processor 310 controls the positions and the movements of the game pieces by generating various control signals and transmitting the various control signals to the first and second actuator driver ICs 314a and 314b and the electromagnet controller 316. Similarly, the processor 310 controls and manages various functionalities and operations such as charge control, buzzer control, movement recording, and the like. Examples of the processor 310 include, but are not limited to, an application-specific integrated circuit (ASIC) processor, a reduced instruction set computing (RISC) processor, a complex instruction set computing (CISC) processor, and a field-programmable gate array (FPGA). It will be apparent to a person skilled in the art that the processor 310 is compatible with multiple operating systems.

The memory 312 is connected to the processor 310 and includes suitable logic, circuitry, and/or interfaces to store one or more instructions that are executed by the processor 310 to perform its operations. The memory 312 stores the moves played by the first player 102a and the moves received from the first player device 104a, the server 108, or the second game board 106b. The memory 312 further stores position information of each game piece on the first game board 106a and a status of the game. The status of the game is information about the stage of the game such as 'in-play', 'draw', 'stale-mate', 'check-mate', and the like. Examples of the memory 312 include, but are not limited to, a random-access memory (RAM), a read-only memory (ROM), a programmable ROM (PROM), and an erasable PROM (EPROM).

The first and second actuator driver ICs 314a and 314b drive various actuators (shown in FIGS. 4A, 4B, 7A, 7B, 8A, and 8B). The first and second actuator driver ICs 314a and 314b are connected to the processor 310, and drive the actuators based on the control signals received from the processor 310. The electromagnet controller 316 controls activation of an electromagnet (shown in FIGS. 5, 7A, 7B, 8A, and 8B). The electromagnet controller 316 is connected to the processor 310 for receiving the control signals. In an embodiment, the electromagnet controller 316 is a metal oxide semiconductor field effect transistor (MOSFET) switch, and a gate terminal of the electromagnet controller 316 is connected to the processor 310 for receiving the control signals. Further, the electromagnet controller 316 activates the electromagnet, based on the control signals, to move a game piece from one position to another position.

The network circuit 318 connects the first game board 106a (i.e., the processor 310) to the first player device 104a by way of the first communication network 110a. Similarly, the network circuit 318 connects the first game board 106a to the second game board 106b and the server 108 by way of the third communication network 110c. Examples of the network circuit 318 include a Wi-Fi module, a Bluetooth module, a BLE module, and the like. In a scenario, the network circuit 318 is the BLE module (such as BLE 4.1), and the first game board 106a is connected to the first player device 104a by way of the BLE module and the first communication network 110a, i.e., the BLE network. In another scenario, the network circuit 318 is the Wi-Fi module and the first game board 106a is connected to the server 108 by way the Wi-Fi module and the third communication network 110c, i.e., the Wi-Fi network. In yet another scenario, the network circuit 318 is a combination of the BLE module and the Wi-Fi module. The buzzer 320 produces various audio sounds that indicate occurrences of various events such as power on, movement of the game pieces, invalid moves, and the like.

The battery 306 is connected to the processor 310 for supplying power to the first game board 106a. Examples of the battery 306 include a lithium ion (Li-ion) battery, a nickel cadmium (Ni—Cd) battery, and the like. In an embodiment, the battery 306 is a rechargeable battery which is charged by the external power supply circuit. In another embodiment, the battery 306 is a non-rechargeable battery.

The drive system 308 is connected to the first and second actuator driver ICs 314a and 314b, and the electromagnet controller 316 for controlling the positions and the movements of the game pieces. The drive system 308 is controlled by the motherboard 304 based on a move played by the second player 102b, by the AI player, or during the selected match. Various implementations of the drive system 308 are explained in detail in conjunction with FIGS. 4-8.

Although the disclosure describes the recording of the first move of the first player 102a by way of the sensor surface 302, it will be apparent to a person skilled in the art that the scope of the disclosure is not limited to it. In another embodiment of the disclosure, the first player 102a provides an audio command for playing the first move to a virtual assistant, without deviating from the scope of the disclosure. The virtual assistant transmits the audio command to server 108. The server 108 further transmits the audio command to the first game board 106a by way of the third communication network 110c. In yet another embodiment, the virtual assistant may transmit the audio command to the processor 310 by way of the first communication network 110a and the network circuit 318. In yet another embodiment, the first player 102a provides the audio command for playing the first move to a first microphone (not shown) of the first player device 104a or a second microphone (not shown) of the first game board 106a.

Figure 4A:
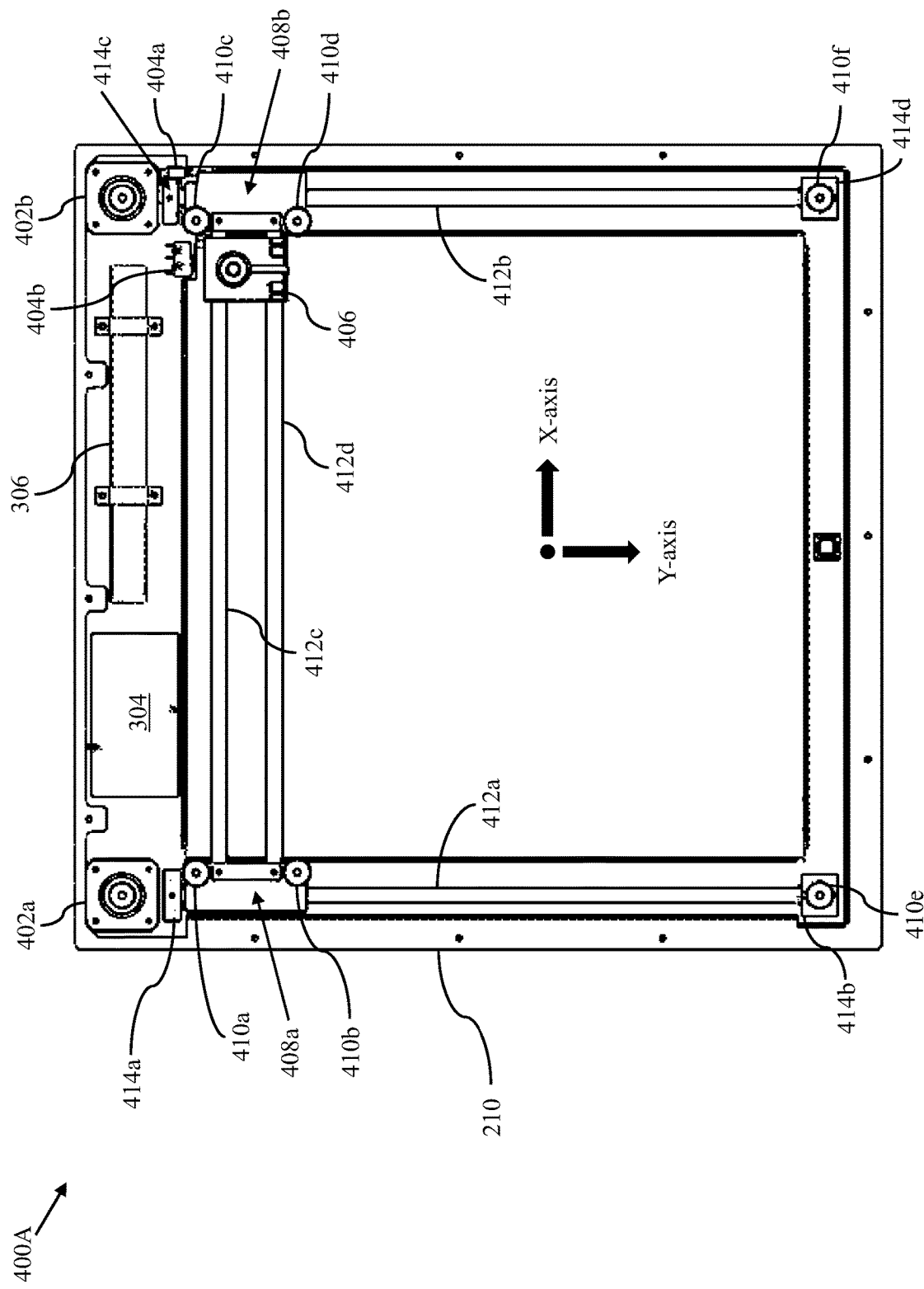
FIG. 4A is a top view of a drive system of the gaming system of FIG. 3, in accordance with an embodiment of the disclosure.
Figure 4B:
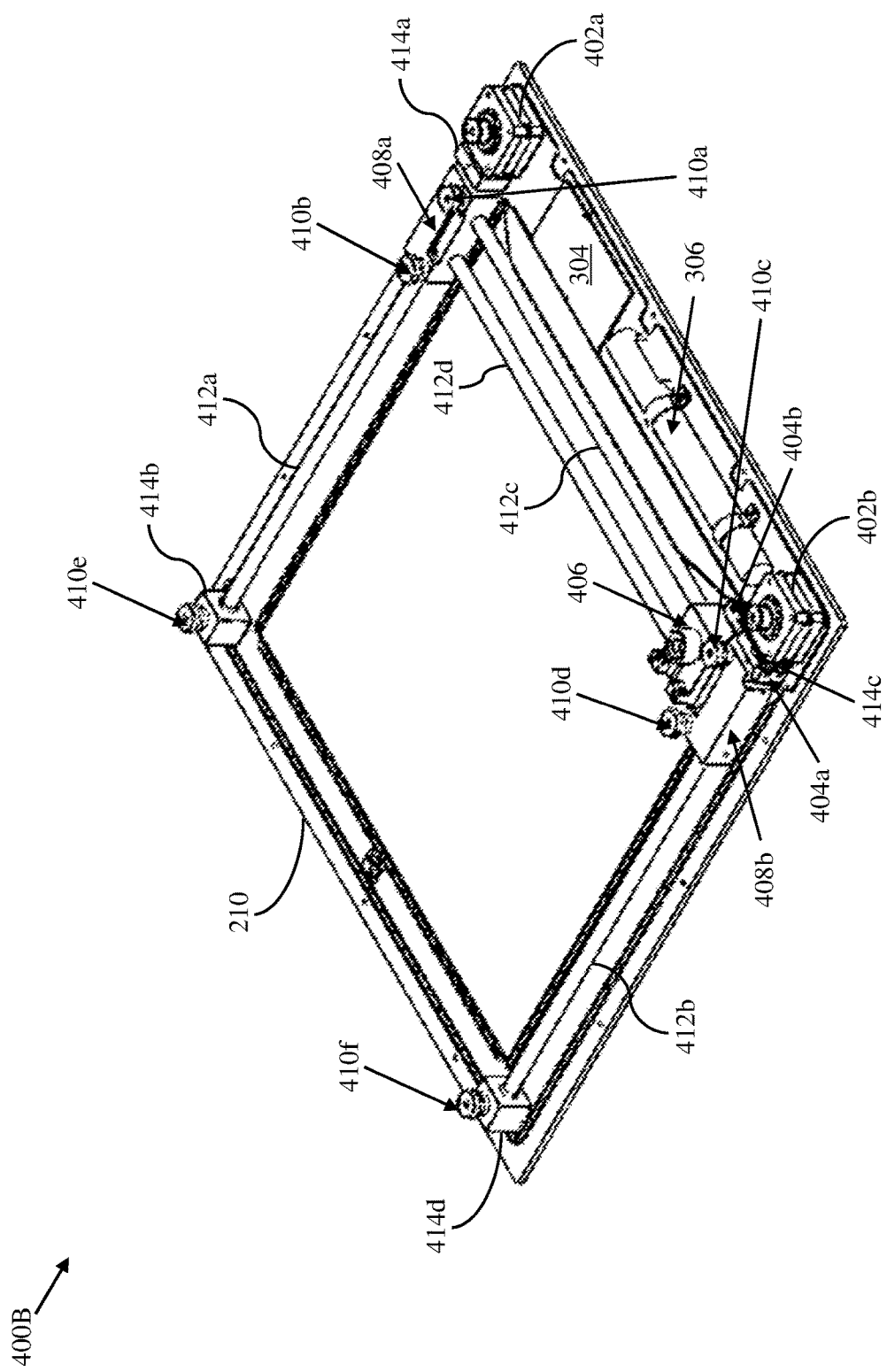
FIG. 4B is a perspective view of the drive system, in accordance with an embodiment of the disclosure.

FIGS. 4A and 4B are top and perspective views 400A and 400B of the drive system 308, respectively, in accordance with an embodiment of the disclosure. As illustrated in FIGS. 4A and 4B, the drive system 308 includes first and second actuators 402a and 402b, first and second limit switches 404a and 404b, a first robotic arm 406, first and second side mounts 408a and 408b, first through sixth radial bearings 410a-410f, first through fourth shafts 412a-412d, and first through fourth end mounts 414a-414d.

The first and second actuators 402a and 402b are driven by the first and second actuator driver ICs 314a and 314b, respectively. Alternatively, the first and second actuators 402a and 402b are driven by the first actuator driver IC 314a. First and second direction of rotations of the first and second actuators 402a and 402b, respectively, control the movement of a first belt (not shown) that further controls the movement of the first robotic arm 406. For example, if the first direction is clockwise and the second direction is anti-clockwise, the first robotic arm 406 moves downwards along Y-axis (i.e., away from the motherboard 304). If the first and second directions are clockwise, the first robotic arm 406 moves towards left along X-axis (i.e., towards the first shaft 412a). If the first direction is anti-clockwise and the second direction is clockwise, the first robotic arm 406 moves upwards along the Y-axis (i.e., towards the motherboard 304). If the first and second directions are anti-clockwise, the first robotic arm 406 moves towards right along the X-axis (i.e., towards the second shaft 412b).

If the first actuator 402a rotates clockwise and the second actuator 402b does not rotate, the first robotic arm 406 moves towards down left (i.e., towards the second end mount 414b). If the first actuator 402a does not rotate and the second actuator 402b rotates clockwise, the first robotic arm 406 moves towards up left (i.e., towards the first actuator 402a). If the first actuator 402a rotates anti-clockwise and the second actuator 402b does not rotate, the first robotic arm 406 moves towards up right (i.e., towards the second actuator 402b). If the first actuator 402a does not rotate and the second actuator 402b rotates anti-clockwise, the first robotic arm 406 moves towards down right (i.e., towards the fourth end mount 414d). If the first actuator 402a does not rotate and the second actuator 402b does not rotate, the first robotic arm 406 does not move. Examples of the first and second actuators 402a and 402b include stepper actuators, geared DC actuators, brushless DC actuators, servo actuators, and the like.

The first and second limit switches 404a and 404b are used for a homing process of the first robotic arm 406 executed by the processor 310. It will be apparent to a person skilled in the art that the scope of the disclosure is not limited to the positions of the first and second limit switches 404a and 404b as shown in FIG. 4. In various other embodiments of the disclosure, the positions of the first and second limit switches 404a and 404b may vary, without deviating from the scope of the disclosure.

The homing process is a process of moving the first robotic arm 406 to a reference position. To move the first robotic arm 406 to the reference position, the first actuator 402a rotates anti-clockwise and the second actuator 402b rotates clockwise such that the first robotic arm 406 moves upwards along the Y-axis. When the first limit switch 404a corresponding to the Y-axis gets activated by the movement of the first robotic arm 406, the first and second actuators 402a and 402b stop rotating. The first and second actuators 402a and 402b then rotate clockwise to move the first robotic arm 406 rightwards along the X-axis. When the second limit switch 404b gets activated by the movement of the first robotic arm 406, the first and second actuators 402a and 402b stop rotating. Thus, the first robotic arm 406 reaches the reference position (as illustrated in FIGS. 4A and 4B). After reaching the reference position, the first robotic arm 406 is moved to an origin position which has the co-ordinates as (0,0). In an embodiment, the origin position is a center of the play area 202. In another embodiment, the origin position is under the square 'a1' of the play area 202. Co-ordinates of each square are determined based on and with respect to the origin position. Further, the movements of the first robotic arm 406 are determined based on and with respect to the origin position. In an alternative embodiment, the homing process is executed based on a counter electro-motive force of the first and second actuators 402a and 402b. The first and second actuator driver ICs 314a and 314b determine the counter electromotive force of the first and second actuators 402a and 402b, respectively. Thus, a need for the first and second limit switches 404a and 404b is eliminated.

It will be apparent to a person skilled in the art that the scope of the disclosure is not limited to the aforementioned homing processes. In various other embodiments of the disclosure, various known-in-the-art homing processes may be implemented, without deviating from the scope of the disclosure.

The first robotic arm 406 moves the game pieces on the first game board 106a. The first robotic arm 406 is moved based on the amount and the direction of rotation of the first and second actuators 402a and 402b. In an embodiment, the first robotic arm 406 includes a first electromagnet (shown in FIG. 5) that is activated by the electromagnet controller 316. The first robotic arm 406 may further include a first spring (not shown) onto which the first electromagnet is attached. The height of the first electromagnet is controlled by way of the first spring. To move a game piece from a start position to an end position, the first robotic arm 406 is moved towards the start position. When the first robotic arm 406 reaches the start position, the first electromagnet is activated by the electromagnet controller 316. The game piece includes a magnet that is attracted towards the activated first electromagnet and forms a magnetic contact with the first electromagnet. The first robotic arm 406 is then moved towards the end position, resulting into the movement of the game piece towards the end position. When the first robotic arm 406 reaches the end position, the first electromagnet is de-activated, thereby breaking the magnetic contact between the game piece and the first electromagnet. Thus, the movement of the game piece is simulated by using the first robotic arm 406. Additionally, when a game piece at a first position is captured by another game piece that comes from a second position, the captured game piece is popped up on the play area 202. To pop up the captured game piece, the first robotic arm 406 is moved towards the first position. When the first robotic arm 406 reaches the first position, the electromagnet controller 316 activates the first electromagnet such that polarities of the first electromagnet are reversed, thereby popping up the captured game piece. The first player 102a then removes the captured game piece from the play area 202. Further, the capturing game piece is moved from the second position to the first position in a similar manner as described above.

Although FIGS. 4A and 4B describe that the first robotic arm 406 includes the first electromagnet for movement of the game pieces, the scope of the disclosure is not limited to it. In another embodiment, the first robotic arm 406 includes a first permanent magnet (not shown) for the movement of the game pieces, without deviating from the scope of the disclosure. The first robotic arm 406 further includes a third actuator (not shown), such as a servo actuator, a stepper actuator, a geared DC actuator, a brushless DC actuator, and the like, to move the first permanent magnet upwards or downwards. The upward or downward movement of the first permanent magnet using the third actuator is controlled by the processor 310. To move a game piece from the start position to the end position, the first robotic arm 406 is moved towards the start position. When the first robotic arm 406 reaches the start position, the first permanent magnet is moved upwards by the third actuator. The game piece includes a magnet that is attracted towards the first permanent magnet and that forms the magnetic contact with the first permanent magnet. The first robotic arm 406 is then moved towards the end position, resulting into the movement of the game piece towards the end position. When the first robotic arm 406 reaches the end position, the first permanent magnet is moved downwards by the third actuator, thereby breaking the magnetic contact between the game piece and the first permanent magnet.

The amount and the direction of rotation of the first and second actuators 402a and 402b are determined by the processor 310 based on commands received from the first player device 104a, the second game board 106b, or the server 108. The commands correspond to the moves played by the first player 102a, the second player 102b, the AI player, the players in the selected match, or during the auto-reset. In an embodiment, a command includes start and end indicators and start and end positions. For example, if a 'knight' moves from 'g1' to 'f3', the command is 'xg1f3z', where 'x' is the start indicator of the command, 'g1' is the start position of the game piece, i.e., the square at which the game piece is currently positioned, 'f3' is the end position of the game piece, i.e., the square at which the game piece is to be moved, and 'z' is the end indicator of the command. The movement of the game piece is along the edges of the squares of the play area 202 and the first and second parking areas 204a and 204b, thereby avoiding displacement of game pieces positioned along a path of the game piece. The processor 310 determines the co-ordinates of the start and end positions for moving the game piece based on the origin position. The processor 310 further determines the amount and the direction of rotation of the first and second actuators 402a and 402b based on the co-ordinates of the start and end positions.

In another embodiment, the command includes a string corresponding to co-ordinate data. In an example, the string is '(1,0) (0.5, 0.5) (0.5, 1.5) (0,2)'. The processor 310 receives the co-ordinate data that includes the co-ordinates of the start, intermediate, and end positions and hence the need for determining the co-ordinates by the processor 310 is eliminated. The string corresponds to a move. A first element of the string is the start position, the second and third elements are intermediate positions, and a last element (i.e., a fourth element) is the end position. For example, the first through fourth elements indicate a movement of a 'knight'. Further, the movement of the game piece is along the edges of the squares of the play area 202 and the first and second parking areas 204a and 204b, thereby avoiding displacement of game pieces positioned along the path of the game piece. Thus, based on the string, the 'knight' positioned in the square 'b1' (i.e., the co-ordinates (1,0)) is moved to the square 'a3' (i.e., the co-ordinates (0,2)) by moving the 'knight' along the edges of the squares 'a2' and 'b2'. Hence, the displacement of game pieces positioned in the squares 'a1', 'a2', 'b2', and 'b3' is avoided. The processor 310 further determines the amount and the direction of rotation of the first and second actuators 402a and 402b based on the co-ordinates of the start, intermediate, and end positions.

The first and second side mounts 408a and 408b are mechanical mounts for supporting the third and fourth shafts 412c and 412d. The first and second side mounts 408a and 408b are slidably attached to the first and second shafts 412a and 412b for enabling the movement of the first robotic arm 406 along the Y-axis. The first through sixth radial bearings 410a-410f control motion of the first belt. Further, the motion of the first belt controls the movement of the first robotic arm 406 in various directions. The first and second radial bearings 410a and 410b are mounted on the first side mount 408a. The third and fourth radial bearings 410c and 410d are mounted on the second side mount 408b. The fifth and sixth radial bearings 410e and 410f are mounted on the second and fourth end mounts 414b and 414d, respectively.

The first and second shafts 412a and 412b are metallic shafts that are parallel to and spaced apart from each other. The first and second shafts 412a and 412b allow the first and second side mounts 408a and 408b to move along the Y-axis, respectively. The movements of the first and second side mounts 408a and 408b thus control the movement of the first robotic arm 406 along the Y-axis. Similarly, the third and fourth shafts 412c and 412d are metallic shafts that are parallel to and spaced apart from each other, and are perpendicular to the first and second shafts 412a and 412b. The third and fourth shafts 412c and 412d are fixedly attached to the first and second side mounts 408a and 408b. Further, the first robotic arm 406 is slidably attached to the third and fourth shafts 412c and 412d. The third and fourth shafts 412c and 412d thus allow the first robotic arm 406 to move along the X-axis.

The first and second end mounts 414a and 414b are mechanical mounts for supporting the first shaft 412a. Similarly, the third and fourth end mounts 414c and 414d are mechanical mounts for supporting the second shaft 412b.

Although the FIGS. 4A and 4B describe that two shafts (i.e., the third and fourth shafts 412c and 412d) are fixedly attached to the first and second side mounts 408a and 408b for slidably holding the first robotic arm 406, the scope of the disclosure is not limited to it. In various other embodiments, a single shaft (i.e., the third shaft 412c) may be fixedly attached to the first and second side mounts 408a and 408b for slidably holding the first robotic arm 406, without deviating from the scope of the disclosure.

Figure 5:
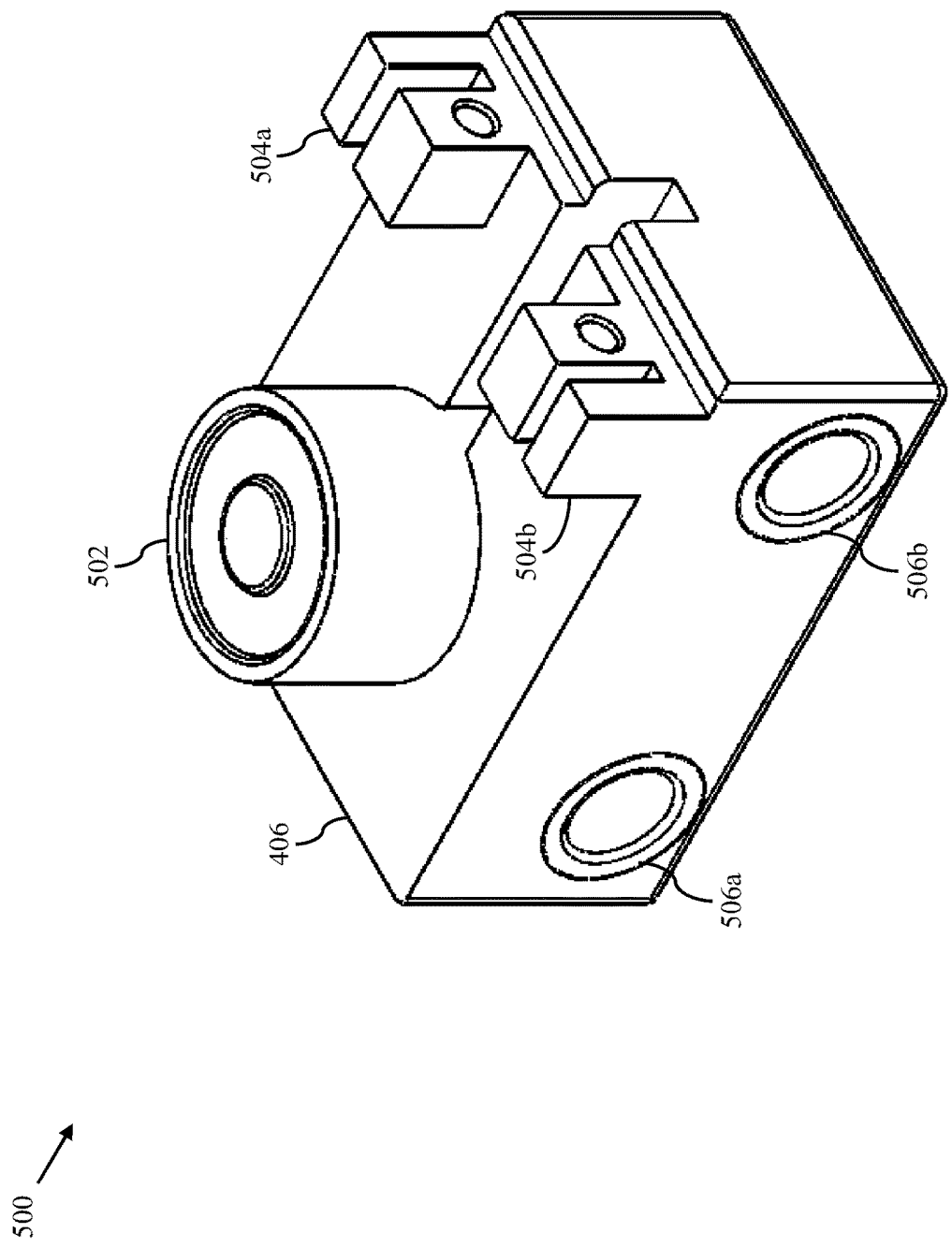
FIG. 5 is a perspective view of a first robotic arm of the drive system of FIGS. 4A and 4B, in accordance with an embodiment of the disclosure.

FIG. 5 is a perspective view 500 of the first robotic arm 406, in accordance with an embodiment of the disclosure. The first robotic arm 406 includes the first electromagnet 502, first and second protrusions 504a and 504b, first and second linear bearings 506a and 506b, and third and fourth linear bearings (not shown). The first robotic arm 406 controls the movement of the game pieces of the first game board 106a.

The first electromagnet 502 is controlled by the electromagnet controller 316. When the electromagnet controller 316 activates the first electromagnet 502, a magnet of a game piece on the sensor surface 302 above the first electromagnet 502 is attracted towards the activated first electromagnet 502. Thus, the magnetic contact is formed between the game piece and the first electromagnet 502. When the electromagnet controller 316 deactivates the first electromagnet 502 the magnetic contact is broken between the game piece and the first electromagnet 502. Further, when the electromagnet controller 316 reverses the polarities of the first electromagnet 502, the game piece is popped up on the play area 202.

The first and second protrusions 504a and 504b firmly hold start and end portions of the first belt, respectively, such that the motion of the first robotic arm 406 is controlled by the motion of the first belt. The first and second protrusions 504a and 504b are mounted on top of the first robotic arm 406.

The first and second linear bearing 506a and 506b and the third and fourth linear bearings enable the movement of the first robotic arm 406 along the X-axis on the third and fourth shafts 412c and 412d. The first and second linear bearings 506a and 506b and the third and fourth linear bearings are embedded within the first robotic arm 406. The first linear bearing 506a and the third linear bearing are positioned coaxially within the first robotic arm 406 to slide over the third shaft 412c. The second linear bearing 506b and the fourth linear bearing are positioned coaxially within the first robotic arm 406 to slide over the fourth shaft 412d.

Figure 6:
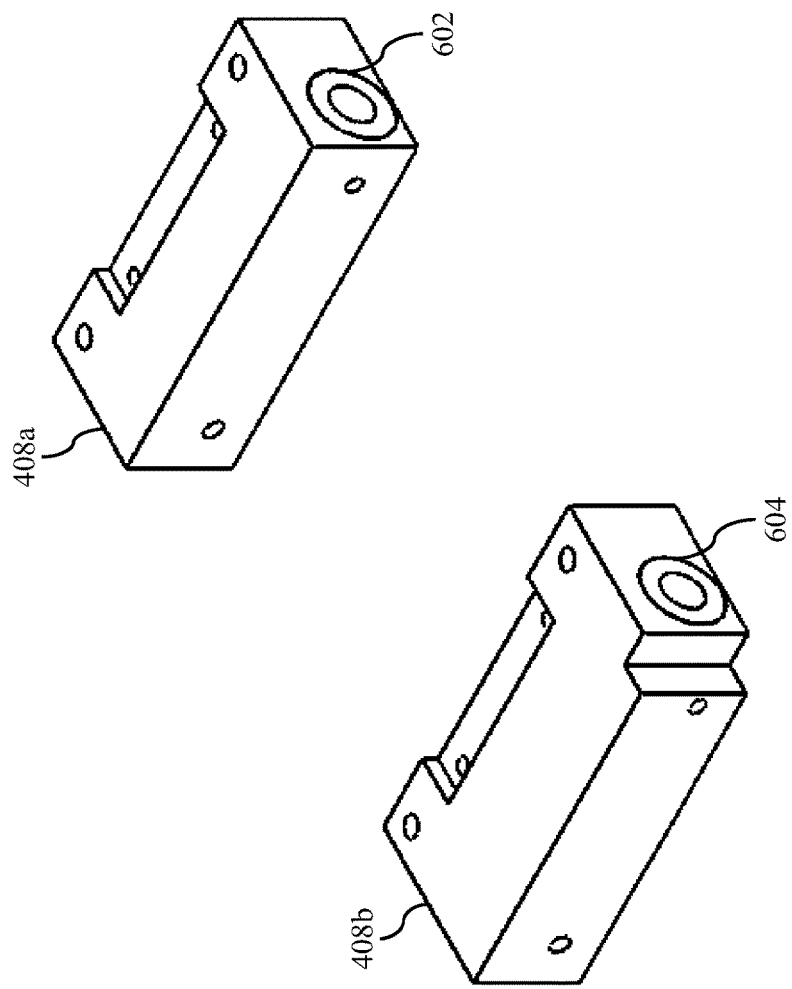
FIG. 6 is a perspective view of first and second side mounts of the drive system of FIGS. 4A and 4B, in accordance with an embodiment of the disclosure.

FIG. 6 is a perspective view 600 of the first and second side mounts 408a and 408b, in accordance with an embodiment of the disclosure. The first side mount 408a includes a fifth linear bearing 602 and a sixth linear bearing (not shown). The second side mount 408b includes a seventh linear bearing 604 and an eighth linear bearing (not shown).

The fifth linear bearing 602 and the sixth linear bearing are positioned coaxially within first side mount 408a to slide over the first shaft 412a. The seventh linear bearing 604 and the eighth linear bearing are positioned coaxially within the second side mount 408b to slide over the second shaft 412b.

Figure 7A:
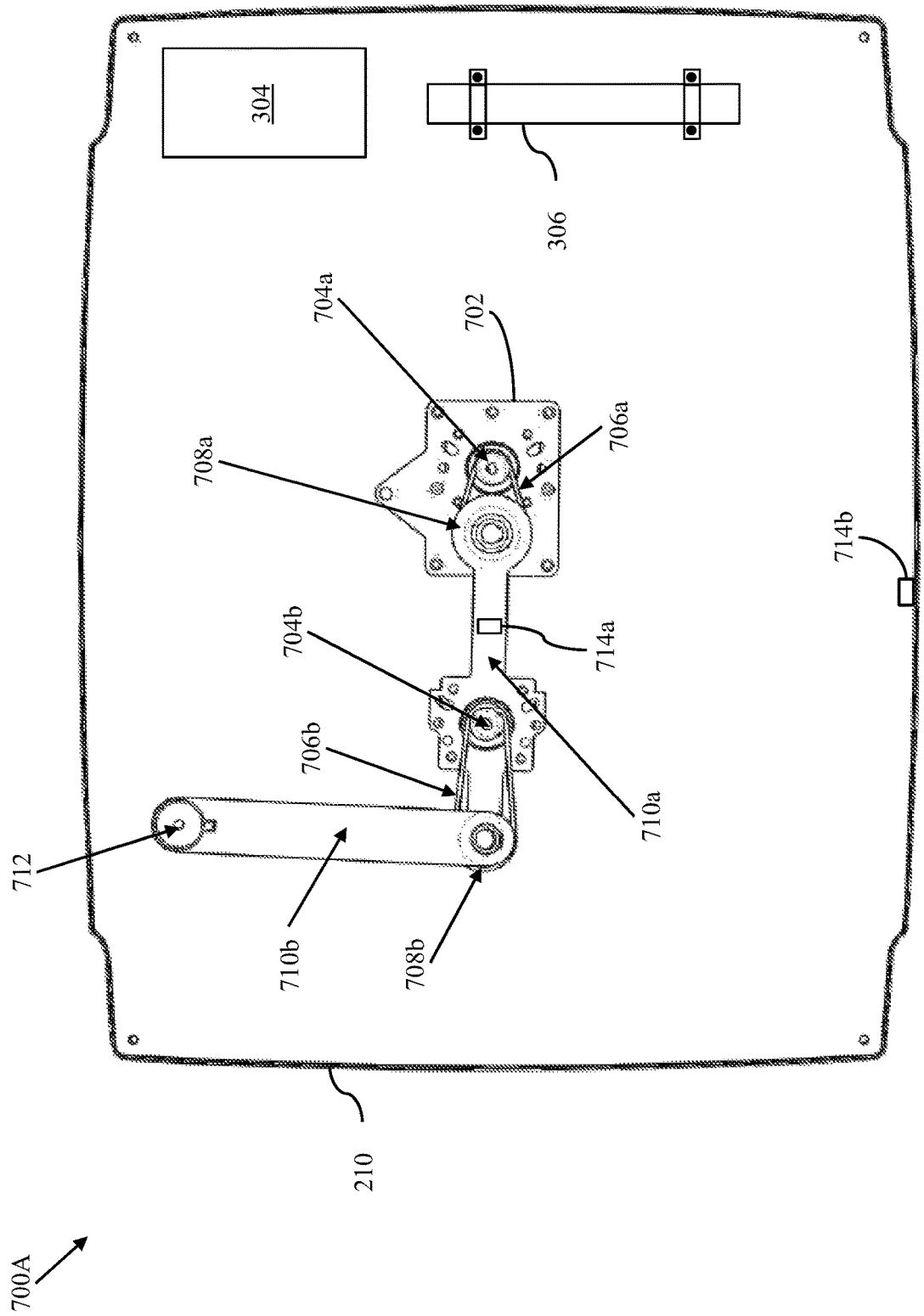
FIG. 7A is the top view of the drive system, in accordance with another embodiment of the disclosure.
Figure 7B:
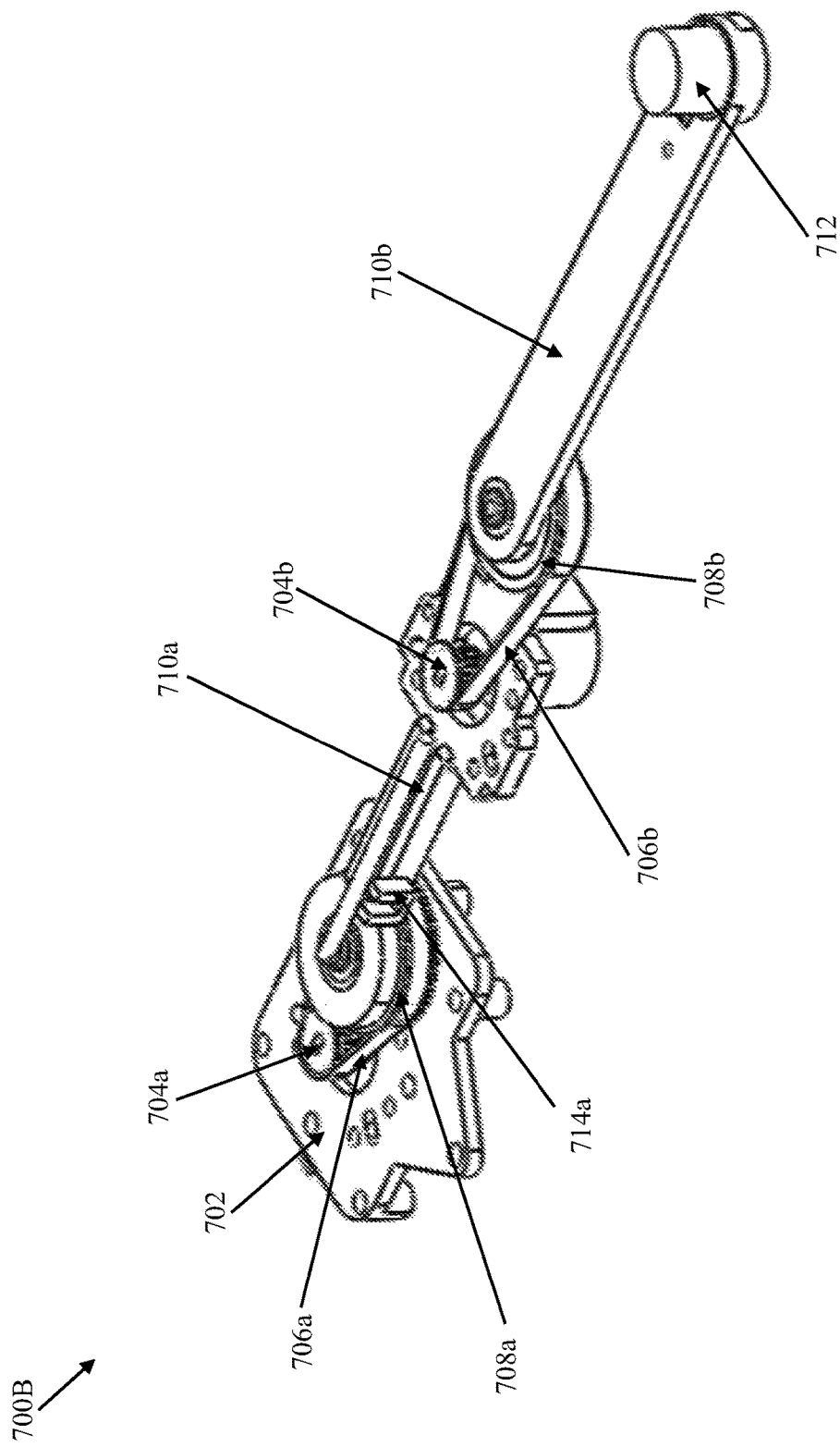
FIG. 7B is the perspective view of the drive system, in accordance with another embodiment of the disclosure.

FIGS. 7A and 7B are the top and perspective views 700A and 700B of the drive system 308, respectively, in accordance with another embodiment of the disclosure. As illustrated in FIGS. 7A and 7B, the drive system 308 includes a first base 702, fourth and fifth actuators 704a and 704b, second and third belts 706a and 706b, first and second pulleys 708a and 708b, first and second links 710a and 710b, and a second electromagnet 712. The first and second links 710a and 710b and the second electromagnet 712 together form a second robotic arm.

The first base 702 houses the fourth actuator 704a. Further, the first base 702 has the first pulley 708a attached thereto. The fourth actuator 704a is connected to the first pulley 708a by way of the second belt 706a. Further, a first end of the first link 710a is attached to the first pulley 708a such that the first link 710a is circularly rotatable (i.e., has a 360-degree rotation) with respect to the first base 702. Third direction of rotation of the fourth actuator 704a controls the movement of the second belt 706a that further controls the rotation of the first pulley 708a. Further, the rotation of the first pulley 708a controls the rotation of the first link 710a. For example, if the third direction is clockwise, the first pulley 708a rotates clockwise. As a result, the first link 710a attached to the first pulley 708a rotates clockwise. Similarly, if the third direction is anti-clockwise, the first pulley 708a rotates anti-clockwise, thereby rotating the first link 710a anti-clockwise.

As illustrated in FIGS. 7A and 7B, the fifth actuator 704b is attached to the first link 710a. Further, the second pulley 708b is attached to a second end of the first link 710a, and is connected to the fifth actuator 704b by way of the third belt 706b. A first end of the second link 710b is attached to the second pulley 708b such that the second link 710b is circularly rotatable with respect to the first link 710a. Further, the second electromagnet 712 is attached onto a second end of the second link 710b by way of a second spring (not shown). The height of the second electromagnet 712 is controlled by way of the second spring. Fourth direction of rotation of the fifth actuator 704b controls the movement of the third belt 706b that further controls the rotation of the second pulley 708b. Further, the rotation of the second pulley 708b controls the rotation of the second link 710b. For example, if the fourth direction is clockwise, the second pulley 708b rotates clockwise. As a result, the second link 710b attached to the second pulley 708b rotates clockwise. Similarly, if the fourth direction is anti-clockwise, the second pulley 708b rotates anti-clockwise, thereby rotating the second link 710b anti-clockwise.

The fourth and fifth actuators 704a and 704b are driven by the first and second actuator driver ICs 314a and 314b, respectively. Alternatively, the fourth and fifth actuators 704a and 704b are driven by the first actuator driver IC 314a. Examples of the fourth and fifth actuators 704a and 704b include stepper actuators, geared DC actuators, brushless DC actuators, servo actuators, and the like.

The lengths of the first and second links 710a and 710b along with the angle of rotation of the first and second links 710a and 710b ensure that the second electromagnet 712 is reachable to each square of the play area 202 and the first and second parking areas 204a and 204b. Thus, the second electromagnet 712, in conjunction with the first and second links 710a and 710b, is capable of moving the game pieces from one position on the play area 202 to another position on the play area 202, or from a position on the play area 202 to a position on one of the first or second parking area 204a or 204b. In various embodiments, the lengths of the first link 710a and the second link 710b are same or different.

The drive system 308 further includes third and fourth limit switches 714a and 714b that are utilized for a homing process of the second robotic arm (i.e., the second electromagnet 712). The third limit switch 714a is attached onto a top surface of the first link 710a and the fourth limit switch 714b is attached onto the bottom support 210. It will be apparent to a person skilled in the art that the scope of the disclosure is not limited to the positions of the third and fourth limit switches 714a and 714b as shown in FIG. 7A. In various other embodiments of the disclosure, the positions of the third and fourth limit switches 714a and 714b may vary, without deviating from the scope of the disclosure. In one embodiment, the third and fourth limit switches 714a and 714b are infrared (IR) sensors. Further, the first and second links 710a and 710b include third and fourth protrusions (not shown) attached to bottom surfaces of the first and second links 710a and 710b, respectively.

During the homing process, the second electromagnet 712 is moved to a reference position. To move the second electromagnet 712 to the reference position, the fourth actuator 704a does not rotate and the fifth actuator 704b rotates to circularly rotate the second link 710b until the fourth protrusion attached to the bottom surface of the second link 710b is in contact with the third limit switch 714a (i.e., until the third limit switch 714a is activated). When the third limit switch 714a is activated, the fifth actuator 704b stops rotating. The fourth actuator 704a then rotates to circularly rotate the first link 710a until the third protrusion on the first link 710a is in contact with the fourth limit switch 714b (i.e., until the fourth limit switch 714b is activated). When the fourth limit switch 714b gets activated, the fourth actuator 704a stops rotating. The fifth actuator 704b then rotates to circularly rotate the second link 710b, such that the second link 710b extends away from the first link 710a. When the second link 710b is at a predefined angle (e.g., 90 degrees) with respect to the first link 710a, the fifth actuator 704b stops rotating. The second electromagnet 712 thus reaches the reference position. In an example, the reference position corresponds to the origin position which has the co-ordinates as (0,0). Co-ordinates of each square are determined based on and with respect to the origin position. Further, the movements of the first and second links 710a and 710b are determined based on and with respect to the origin position.

It will be apparent to a person skilled in the art that the scope of the disclosure is not limited to the implementation of the homing process as described above. In various other embodiments of the disclosure, the homing process may be implemented in a different manner, without deviating from the scope of the disclosure.

The drive system 308 further includes first and second slip rings (not shown) attached to the first and second pulleys 708a and 708b, respectively. The first and second slip rings prevent entanglement of wires by way of which the second electromagnet 712, the fifth actuator 704b, and the third limit switch 714a are connected to the motherboard 304.

The second robotic arm moves the game pieces on the first game board 106a. The first and second links 710a and 710b of the second robotic arm are rotated based on the amount and the direction of rotation of the fourth and fifth actuators 704a and 704b, respectively. The amount and the direction of rotation of the fourth and fifth actuators 704a and 704b are determined by the processor 310 based on commands received from the first player device 104a, the second game board 106b, or the server 108. The commands correspond to the moves played by the first player 102a, the second player 102b, the AI player, the players in the selected match, or during the auto-reset.

To move a game piece from a start position to an end position, the first and second links 710a and 710b are rotated such that the second electromagnet 712 moves towards the start position. When the second electromagnet 712 reaches the start position, the second electromagnet 712 is activated by the electromagnet controller 316. The game piece includes a magnet that is attracted towards the activated second electromagnet 712 and forms a magnetic contact with the second electromagnet 712. The first and second links 710a and 710b are then rotated such that the second electromagnet 712 moves towards the end position, resulting into the movement of the game piece towards the end position. When the second electromagnet 712 reaches the end position, the second electromagnet 712 is de-activated, thereby breaking the magnetic contact between the game piece and the second electromagnet 712. Thus, the movement of the game piece is simulated by using the second robotic arm. Additionally, when a game piece at a first position is captured by another game piece that comes from a second position, the captured game piece is popped up on the play area 202. To pop up the captured game piece, the first and second links 710a and 710b are rotated such that the second electromagnet 712 moves towards the first position. When the second electromagnet 712 reaches the first position, the electromagnet controller 316 activates the second electromagnet 712 such that the polarities of the second electromagnet 712 are reversed, thereby popping up the captured game piece. The first player 102a then removes the captured game piece from the play area 202. Further, the capturing game piece is moved from the second position to the first position in a similar manner as described above.

Although FIGS. 7A and 7B describe that the second robotic arm includes the second electromagnet 712 for the movement of the game pieces, the scope of the disclosure is not limited to it. In another embodiment, the second robotic arm may include a second permanent magnet (not shown) attached onto the second end of the second link 710b, without deviating from the scope of the disclosure. The second robotic arm further includes a sixth actuator (not shown), such as a servo actuator, a stepper actuator, a geared DC actuator, a brushless DC actuator, and the like, attached onto the second end of the second link 710b to move the second permanent magnet upwards or downwards. The upward or downward movement of the second permanent magnet using the sixth actuator is controlled by the processor 310. To move a game piece from the start position to the end position, the first and second links 710a and 710b are rotated such that the second permanent magnet moves towards the start position. When the second permanent magnet reaches the start position, the second permanent magnet is moved upwards by the sixth actuator. The game piece includes a magnet that is attracted towards the second permanent magnet and that forms the magnetic contact with the second permanent magnet. The first and second links 710a and 710b are then rotated such that the second permanent magnet moves towards the end position, resulting in the movement of the game piece towards the end position. When the second permanent magnet reaches the end position, the second permanent magnet is moved downwards by the sixth actuator, thereby breaking the magnetic contact between the game piece and the second permanent magnet.

Although FIGS. 7A and 7B describe that the fourth and fifth actuators 704a and 704b control the movements of the first and second links 710a and 710b by way of the second and third belts 706a and 706b and the first and second pulleys 708a and 708b, respectively, the scope of the disclosure is not limited to it. In various other embodiments, the fourth and fifth actuators 704a and 704b may be connected to the first and second links 710a and 710b by way of various other connectors (such as gears) for controlling the movements of the first and second links 710a and 710b, respectively, without deviating from the scope of the disclosure.

Figure 8A:
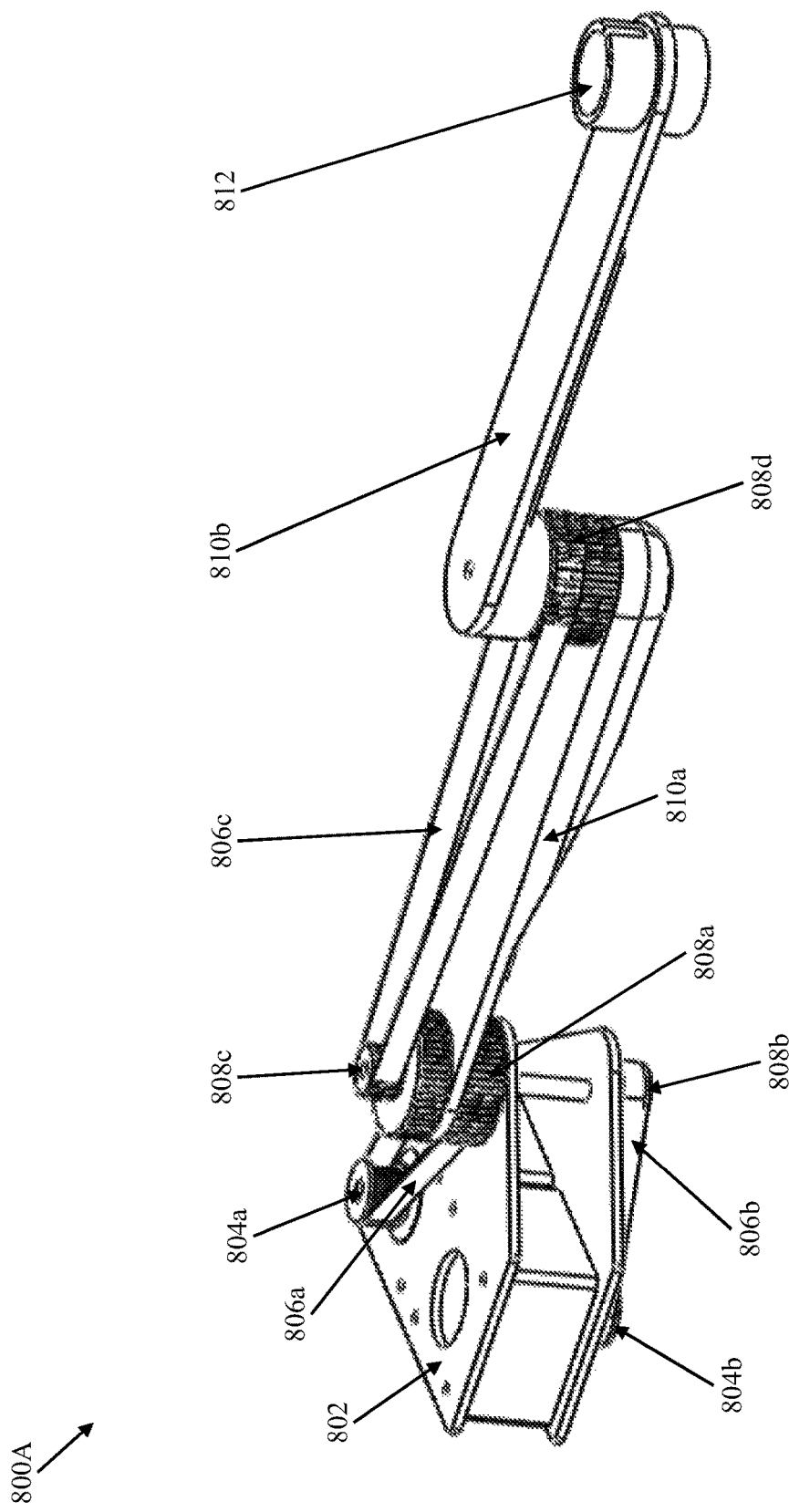
FIG. 8A is the perspective view of the drive system, in accordance with yet another embodiment of the disclosure.
Figure 8B:
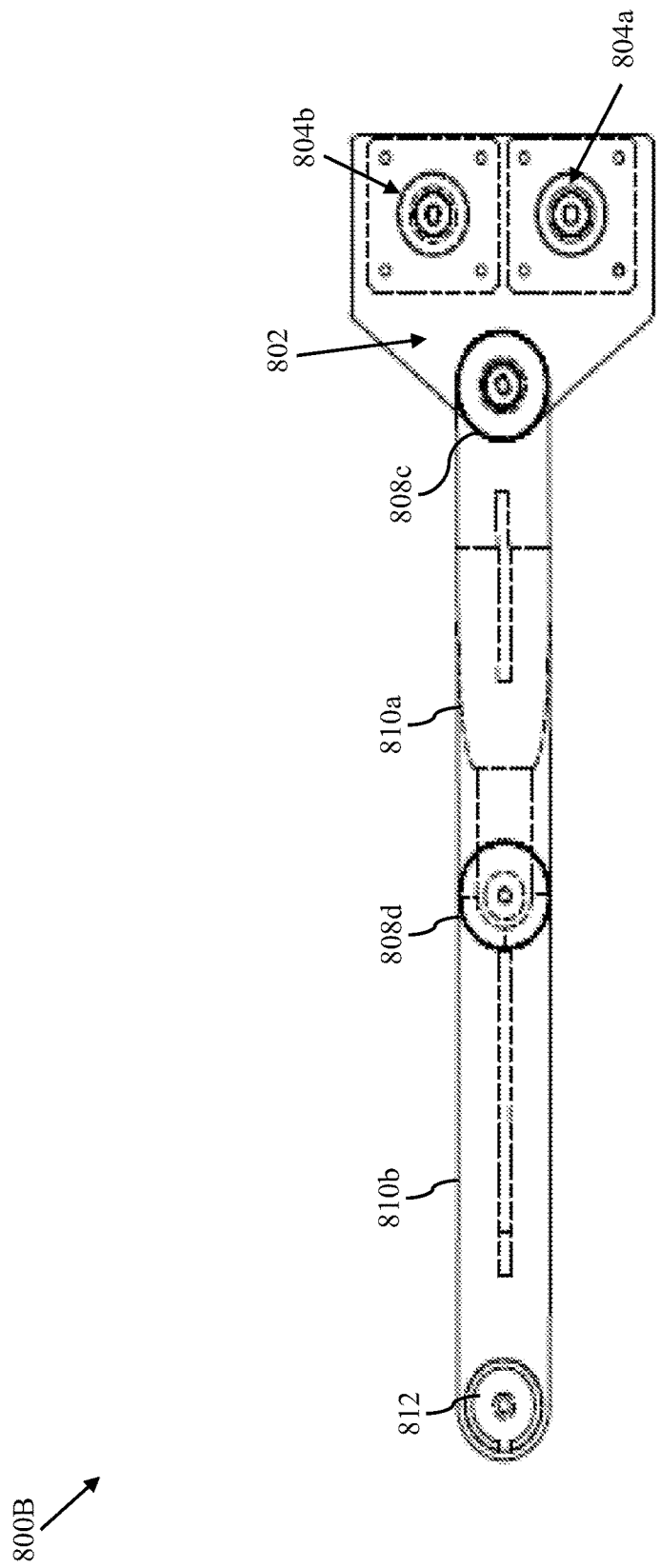
FIG. 8B is the top view of the drive system, in accordance with yet another embodiment of the disclosure.

FIGS. 8A and 8B are the perspective and top views 800A and 800B of the drive system 308, respectively, in accordance with yet another embodiment of the disclosure. As illustrated in FIGS. 8A and 8B, the drive system 308 includes a second base 802, seventh and eighth actuators 804a and 804b, fourth through sixth belts 806a-806c, third through sixth pulleys 808a-808d, third and fourth links 810a and 810b, and a third electromagnet 812. The third and fourth links 810a and 810b and the third electromagnet 812 together form a third robotic arm.

The second base 802 houses the seventh and eighth actuators 804a and 804b, such that a head of the seventh actuator 804a protrudes from a top surface of the second base 802, and a head of the eighth actuator 804b protrudes from a bottom surface of the second base 802. The third pulley 808a is attached to the top surface of the second base 802, and is connected to the seventh actuator 804a by way of the fourth belt 806a. A first end of the third link 810a is attached to the third pulley 808a. The third link 810a is attached to the third pulley 808a such that the third link 810a is circularly rotatable with respect to the second base 802. Fifth direction of rotation of the seventh actuator 804a controls the movement of the fourth belt 806a that further controls the rotation of the third pulley 808a. Further, the rotation of the third pulley 808a controls the rotation of the third link 810a. For example, if the fifth direction is clockwise, the third pulley 808a rotates clockwise. As a result, the third link 810a attached to the third pulley 808a rotates clockwise. Similarly, if the fifth direction is anti-clockwise, the third pulley 808a rotates anti-clockwise, thereby rotating the third link 810a anti-clockwise.

The fourth pulley 808b is attached to the bottom surface of the second base 802, and is connected to the eighth actuator 804b by way of the fifth belt 806b. The fifth pulley 808c is attached to the first end of the third link 810a such that the rotation of the fifth pulley 808c is independent of the rotation of the third pulley 808a. Further, the fifth pulley 808c is connected to the fourth pulley 808b such that the rotation of the fifth pulley 808c is controlled by the rotation of the fourth pulley 808b. The sixth pulley 808d is attached to a second end of the third link 810a, and is connected to the fifth pulley 808c by way of the sixth belt 806c. A first end of the fourth link 810b is attached to the sixth pulley 808d. The fourth link 810b is attached to the sixth pulley 808d such that the fourth link 810b is circularly rotatable with respect to the third link 810a. Further, the third electromagnet 812 is attached onto a second end of the fourth link 810b by way of a third spring (not shown). The height of the third electromagnet 812 is controlled by way of the third spring.

Sixth direction of rotation of the eighth actuator 804b controls the movement of the fifth belt 806b that further controls the rotation of the fourth pulley 808b. The rotation of the fourth pulley 808b controls the rotation of the fifth pulley 808c that further controls the movement the sixth belt 806c. Further, the movement of the sixth belt 806c controls the rotation of the sixth pulley 808d that further controls the rotation of the fourth link 810b. For example, if the sixth direction is clockwise, the fourth through sixth pulleys 808b-808d rotate clockwise. The clockwise movement of the sixth pulley 808d rotates the fourth link 810b clockwise. Similarly, if the sixth direction is anti-clockwise, the fourth through sixth pulleys 808b-808d rotate anti-clockwise, thereby rotating the fourth link 810b anti-clockwise.

The seventh and eighth actuators 804a and 804b are driven by the first and second actuator driver ICs 314a and 314b, respectively. Alternatively, the seventh and eighth actuators 804a and 804b are driven by the first actuator driver IC 314a. Examples of the seventh and eighth actuators 804a and 804b include stepper actuators, geared DC actuators, brushless DC actuators, servo actuators, and the like.

The lengths of the third and fourth links 810a and 810b along with the angle of rotation of the third and fourth links 810a and 810b ensure that the third electromagnet 812 is reachable to each square of the play area 202 and the first and second parking areas 204a and 204b. Thus, the third electromagnet 812, in conjunction with the third and fourth links 810a and 810b, is capable of moving the game pieces from one position on the play area 202 to another position on the play area 202, or from a position on the play area 202 to a position on one of the first or second parking area 204a or 204b. In various embodiments, the lengths of the third link 810a and the fourth link 810b are same or different.

The drive system 308 further includes fifth and sixth limit switches (not shown) that are utilized for a homing process of the third robotic arm (i.e., the third electromagnet 812). The positions and functionalities of the fifth and sixth limit switches are similar to the positions and functionalities of the third and fourth limit switches 714a and 714b, respectively. Further, the third and fourth links 810a and 810b include fifth and sixth protrusions (not shown), respectively. The positions and functionalities of the fifth and sixth protrusions are similar to that of the third and fourth protrusions, respectively. The homing process of the third robotic arm executed by way of the fifth and sixth limit switches and the fifth and sixth protrusions is similar to the homing process of the second robotic arm as described above.

The drive system 308 further includes third and fourth slip rings (not shown) attached to the fifth and sixth pulleys 808c and 808d, respectively. Various functionalities and operations of the third and fourth slip rings are similar to functionalities and operations of the first and second slip rings, respectively, as described above.

The third robotic arm moves the game pieces on the first game board 106a. The third and fourth links 810a and 810b of the third robotic arm are rotated based on the amount and the direction of rotation of the seventh and eighth actuators 804a and 804b, respectively. The amount and the direction of rotation of the seventh and eighth actuators 804a and 804b are determined by the processor 310 based on commands received from the first player device 104a, the second game board 106b, or the server 108. The command corresponds to the moves played by the first player 102a, the second player 102b, the AI player, the players in the selected match, or during the auto-reset. The simulation of a move (i.e., the movement of the game pieces) by way of the third robotic arm is similar to the simulation of a move by way of the second robotic arm as described above.

Although FIGS. 8A and 8B describe that the seventh and eighth actuators 804a and 804b control the movements of the third and fourth links 810a and 810b, respectively, by way of belts and pulleys (such as the fourth through sixth belts 806a-806c and the third through sixth pulleys 808a-808d), the scope of the disclosure is not limited to it. In various other embodiments, the seventh and eighth actuators 804a and 804b may be connected to the third and fourth links 810a and 810b by way of various other connectors (such as gears) for controlling the movements of the third and fourth links 810a and 810b, respectively, without deviating from the scope of the disclosure. In such a scenario, the seventh and eighth actuators 804a and 804b may control the movements of the third and fourth links 810a and 810b by way of the connectors, respectively.

Figure 9A:
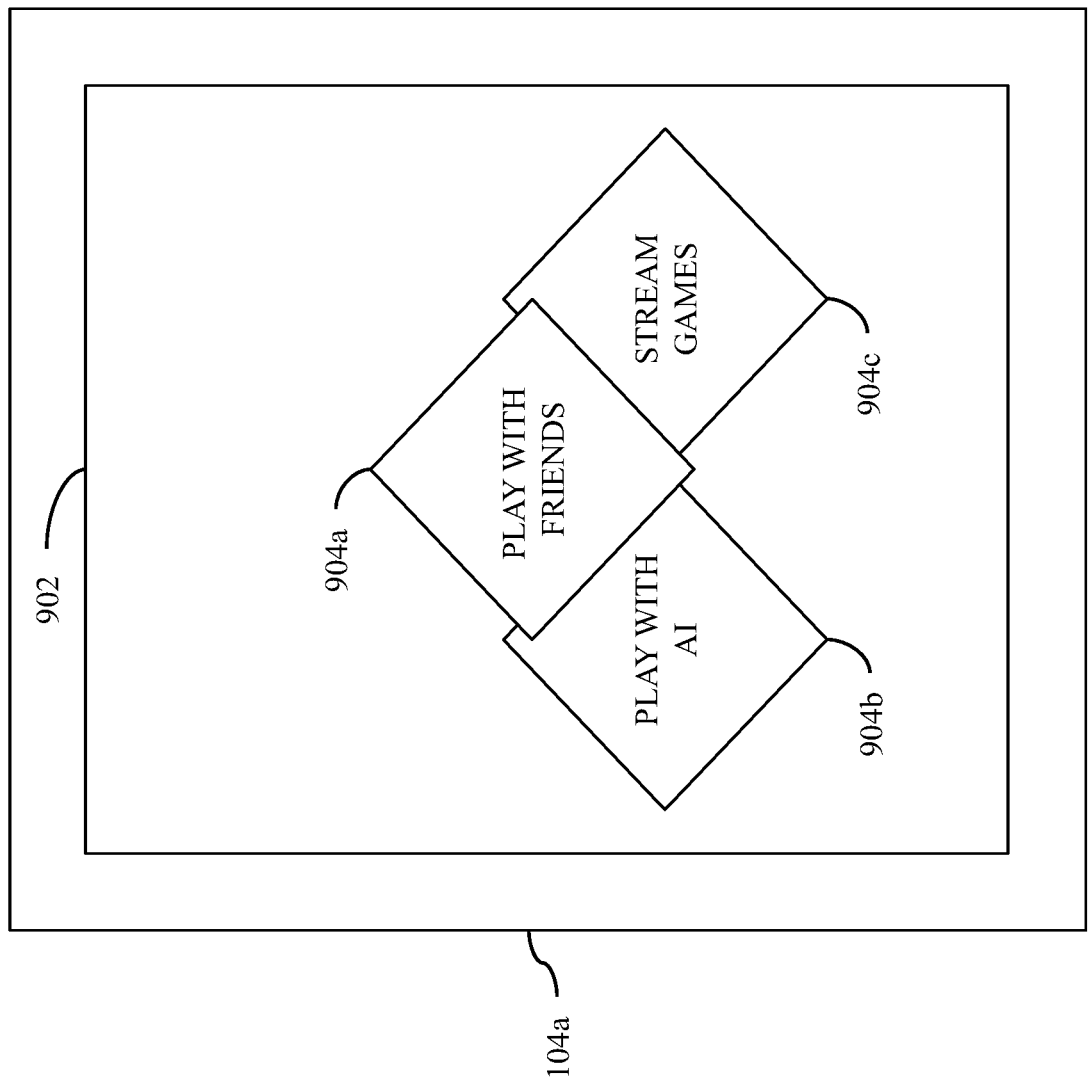
FIG. 9A illustrates a first user interface (UI) rendered on a first player device of the environment of FIG. 1, in accordance with an embodiment of the disclosure.

FIG. 9A illustrates the first UI 902 rendered on the first player device 104a, in accordance with an embodiment of the disclosure. The service application or the server 108 renders the first UI 902 on the first player device 104a, when the first player 102a initiates the board game (i.e., chess). The first UI 902 presents the first through third game modes that are selectable by the first player 102a. The first UI 902 includes first through third options 904a-904c for the first through third game modes, respectively. The first option 904a is the 'Play with Friends' option that is selectable by the first player 102a to play the board game with another player (such as the second player 102b). The second option 904b is the 'Play with AI' option that is selectable by the first player 102a to play the board game with the AI player. The third option 904c is the 'Stream Games' option that is selectable by the first player 102a to stream the selected match on the first game board 106a.

Figure 9B:
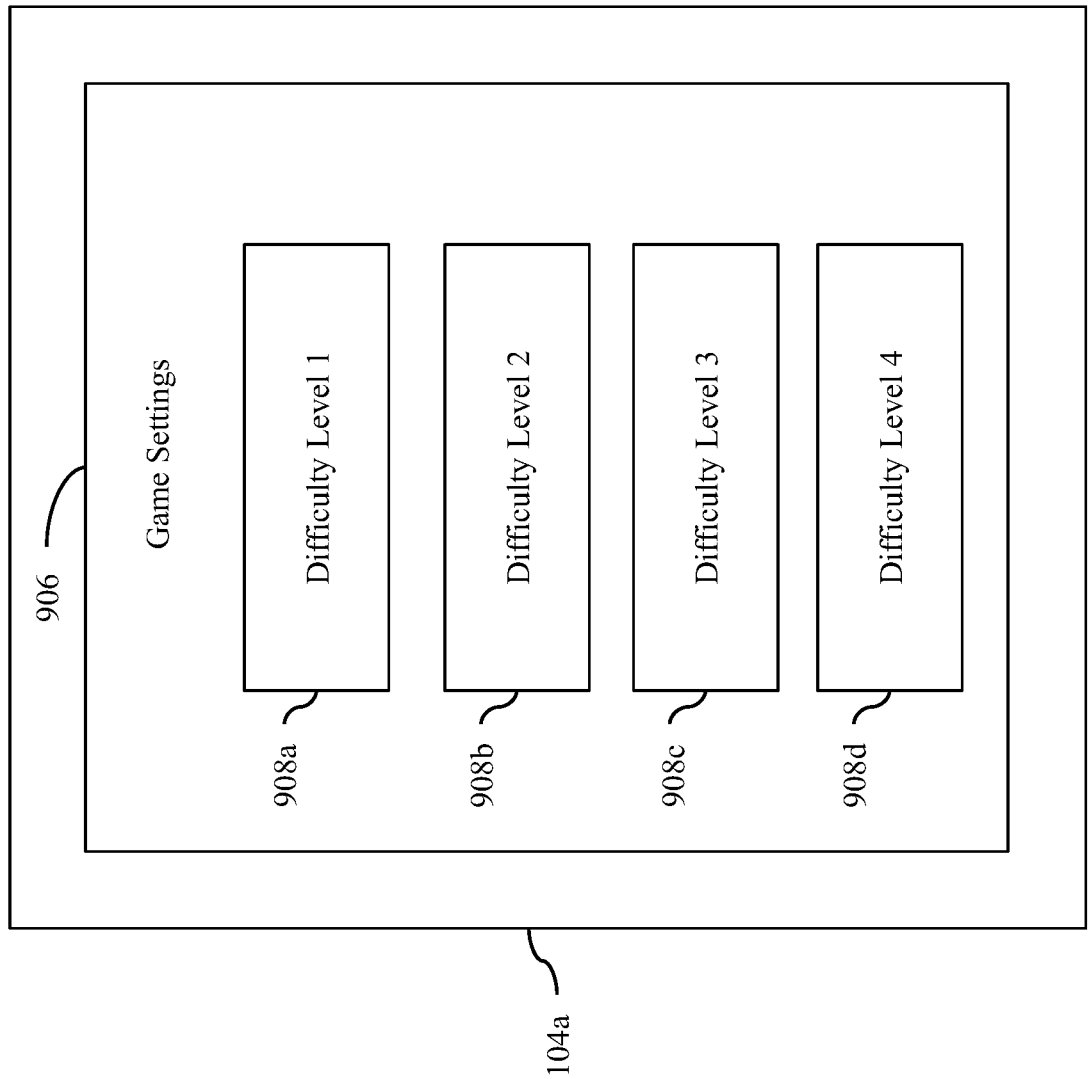
FIG. 9B illustrates a second UI rendered on the first player device, in accordance with an embodiment of the disclosure.

FIG. 9B illustrates the second UI 906 rendered on the first player device 104a, in accordance with an embodiment of the disclosure. The service application or the server 108 renders the second UI 906 when the first player 102a selects the first or second game mode. The second UI 906 presents the set of difficulty levels that are selectable by the first player 102a. The second UI 906 includes fourth through seventh options 908a-908d for selecting a corresponding difficulty level of the board game. The fourth through seventh options 908a-908d indicate first through fourth difficulty levels, respectively. In an embodiment, the fourth option 908a has the least difficulty as compared to the fifth through seventh options 908b-908d.

Figure 9C:
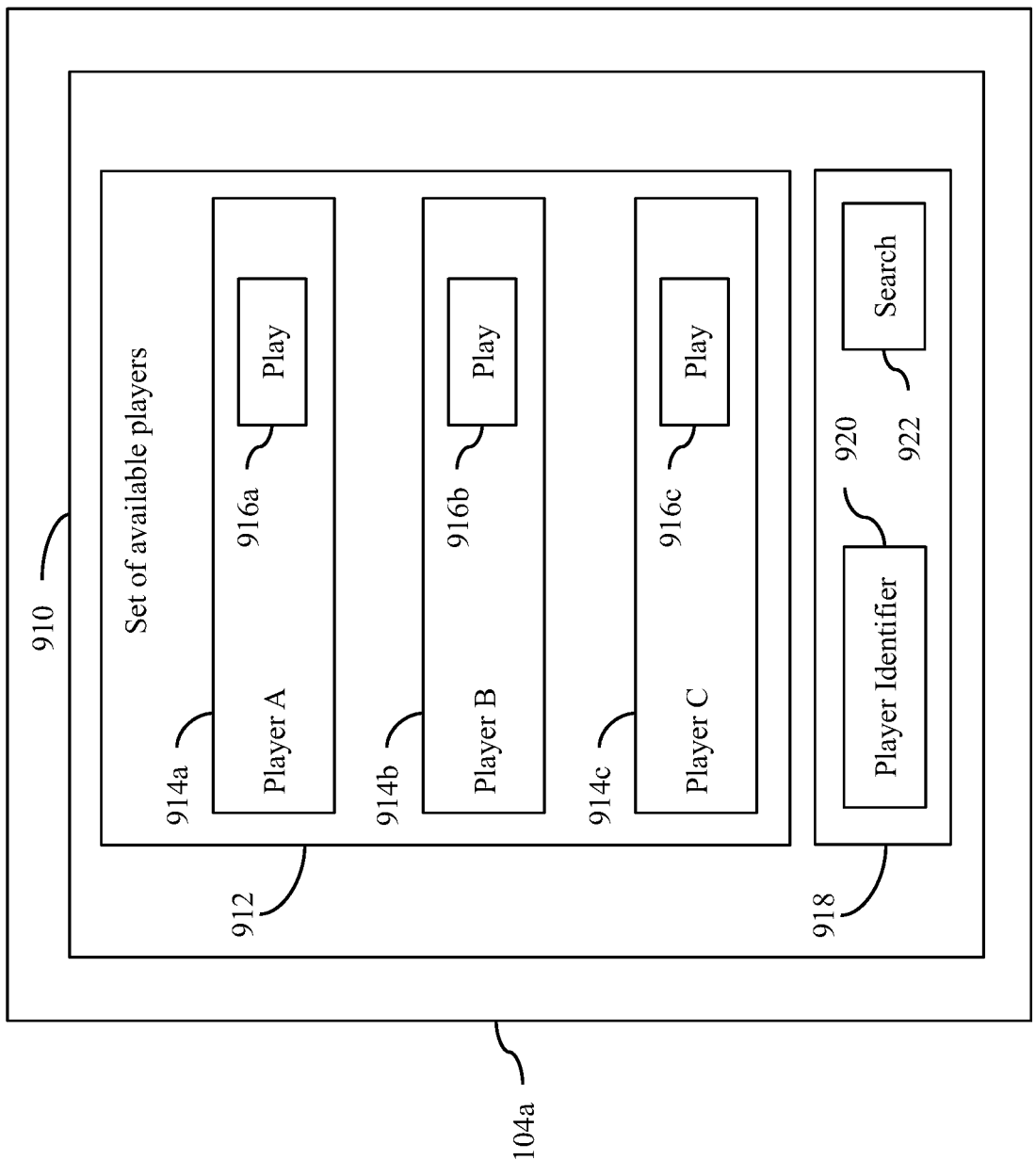
FIG. 9C illustrates a third UI rendered on the first player device, in accordance with an embodiment of the disclosure.

FIG. 9C illustrates the third UI 910 rendered on the first player device 104a, in accordance with an embodiment of the disclosure. The service application or the server 108 renders the third UI 910 when the first player 102a selects the first game mode. The third UI 910 presents the set of available players that are selectable by the first player 102a in a set of available players section 912. The set of available players section 912 includes first through third player information sections 914a-914c. The first through third player information sections 914a-914c include the corresponding player name (such as 'Player A', 'Player B', or 'Player C'), nationality of the players, number of matches won by the players, rating of the players, and the like. Further, the first through third player information sections 914a-914c include eighth through tenth options 916a-916c, respectively. The eighth through tenth options 916a-916c are 'Play' options that are selectable by the first player 102a to play the board game with the corresponding player. Additionally, the third UI 910 presents a manual search section 918. The manual search section 918 includes a 'Player Identifier' section 920 and an eleventh option 922. The first player 102a enters the player ID of the preferred opponent player in the 'Player Identifier' section 920. The eleventh option 922 is a 'Search' option that is selectable by the first player 102a to search for the preferred opponent player based on the player ID.

Figure 9D:
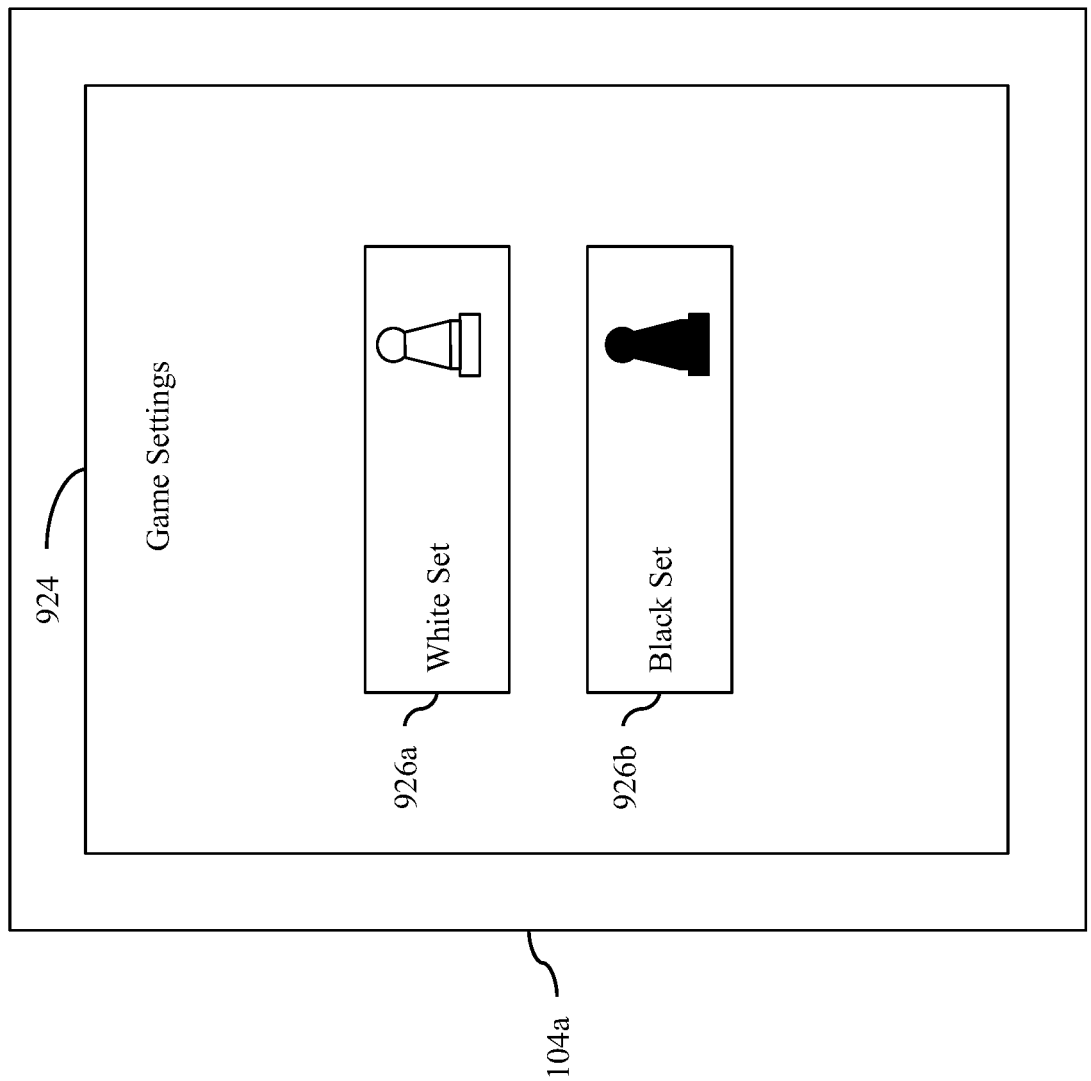
FIG. 9D illustrates a fourth UI rendered on the first player device, in accordance with an embodiment of the disclosure.

FIG. 9D illustrates the fourth UI 924 rendered on the first player device 104a, in accordance with an embodiment of the disclosure. The service application or the server 108 renders the fourth UI 924 for selecting the black or white set of game pieces for playing the board game such as chess. The fourth UI 924 includes the twelfth and thirteenth options 926a and 926b for the white and black sets of game pieces, respectively. The twelfth option 926a is the 'White Set' option that is selectable by the first player 102a to play the board game with the white set of game pieces. The thirteenth option 926b is the 'Black Set' option that is selectable by the first player 102a to play the board game with the black set of game pieces.

FIG. 9E illustrates the fifth UI 928 rendered on the first player device 104a, in accordance with an embodiment of the disclosure. The service application or the server 108 renders the fifth UI 928 when the first player 102a selects the third game mode. The fifth UI 928 presents the set of matches that are selectable by the first player 102a. The fifth UI 928 includes fourteenth through seventeenth options 930a-930d for selecting a corresponding match. The fourteenth option 930a corresponds to a first match played between a 'Player A' and a 'Player B'. The fifteenth option 930b corresponds to a second match played between a 'Player C' and a 'Player D'. The sixteenth option 930c corresponds to a third match played between the 'Player B' and the 'Player C'. The seventeenth option 930d corresponds to a fourth match played between the 'Player A' and the 'Player D'. In an example, the first and second matches are live matches and the third and fourth matches are recorded matches.

Figure 9F:
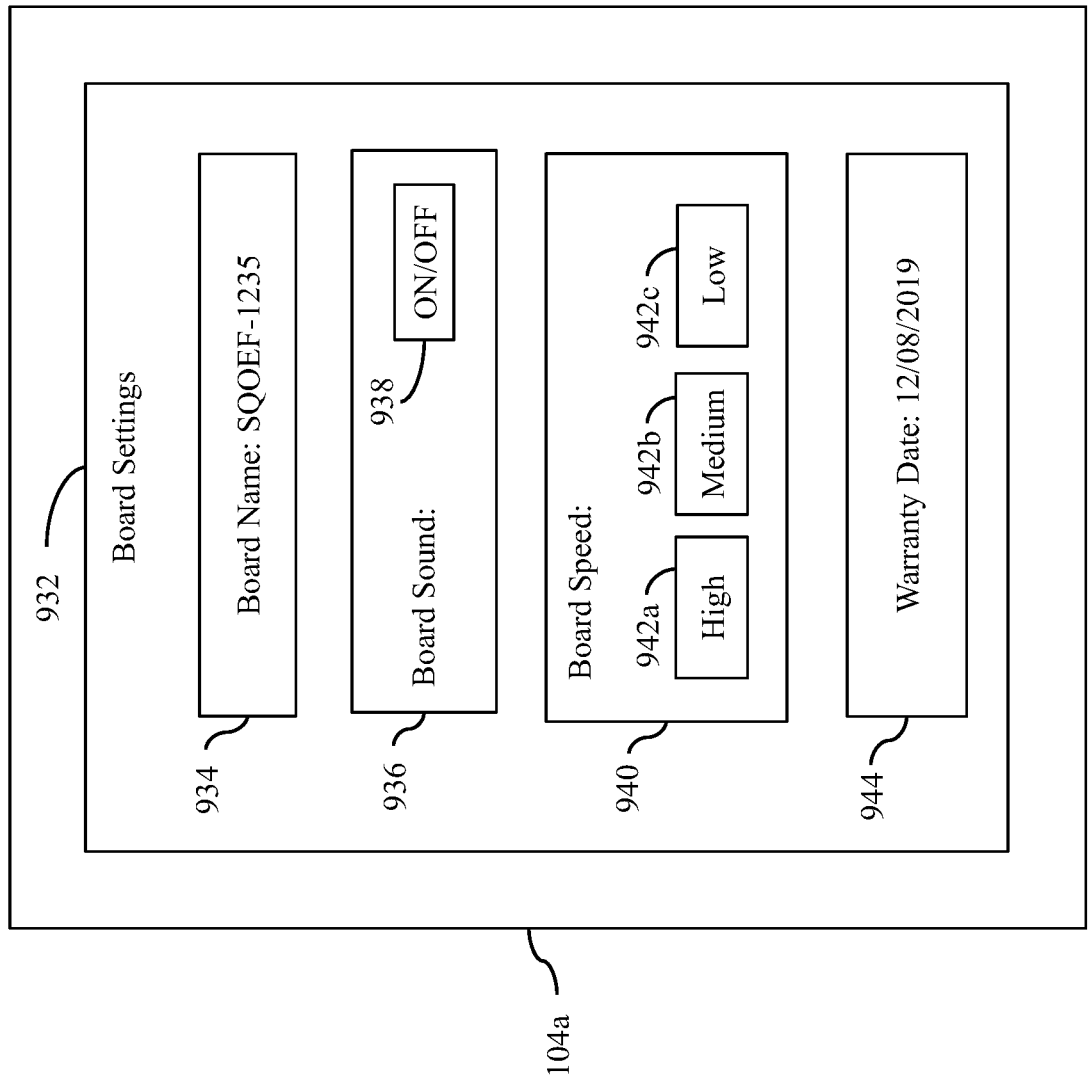
FIG. 9F illustrates a sixth UI rendered on the first player device, in accordance with an embodiment of the disclosure.

FIG. 9F illustrates a sixth UI 932 rendered on the first player device 104a, in accordance with an embodiment of the disclosure. The service application or the server 108 renders the sixth UI 932. The sixth UI 932 displays the various board settings of the first game board 106a. The sixth UI 932 presents a board name section 934 that displays a name of the first game board 106a 'SQOEF-1235'. Further, the sixth UI 932 presents a board sound section 936 that includes an eighteenth option 938. The eighteenth option 938 is an 'ON/OFF' option that is selectable by the first player 102a for switching ON or switching OFF the board sound. The sixth UI 932 further includes a board speed section 940 that includes nineteenth through twenty-first options 942a-942c. The nineteenth through twenty-first options 942a-942c are 'High', 'Medium', and low' options that are selectable by the first player 102a for selecting high, medium, and low speeds of the first game board 106a, respectively. The high, medium, and low speeds of the first game board 106a correspond to movement speed of the game pieces on the first game board 106a. Additionally, the sixth UI 932 presents a warranty section 944 displaying a warranty date such as 'Dec. 8, 2019' of the first game board 106a.

It will be apparent to a person skilled in the art that the scope of the disclosure is not limited to the rendering of the first through sixth UIs 902, 906, 910, 924, 928, and 932. In various other embodiments of the disclosure, the UIs rendered on the first player device 104a may vary in type and sequence. Further, the UIs rendered may vary based on a geographical location of the first player device 104a, a type of the first player device 104a, and the like.

Although the disclosure describes that the first through sixth UIs 902, 906, 910, 924, 928, and 932 are rendered on the first player device 104a, the scope of the disclosure is not limited to it. In various other embodiments, the first through sixth UIs 902, 906, 910, 924, 928, and 932 may be rendered by the server 108 on the first game board 106a, without deviating from the scope of the disclosure.

Figure 10A:
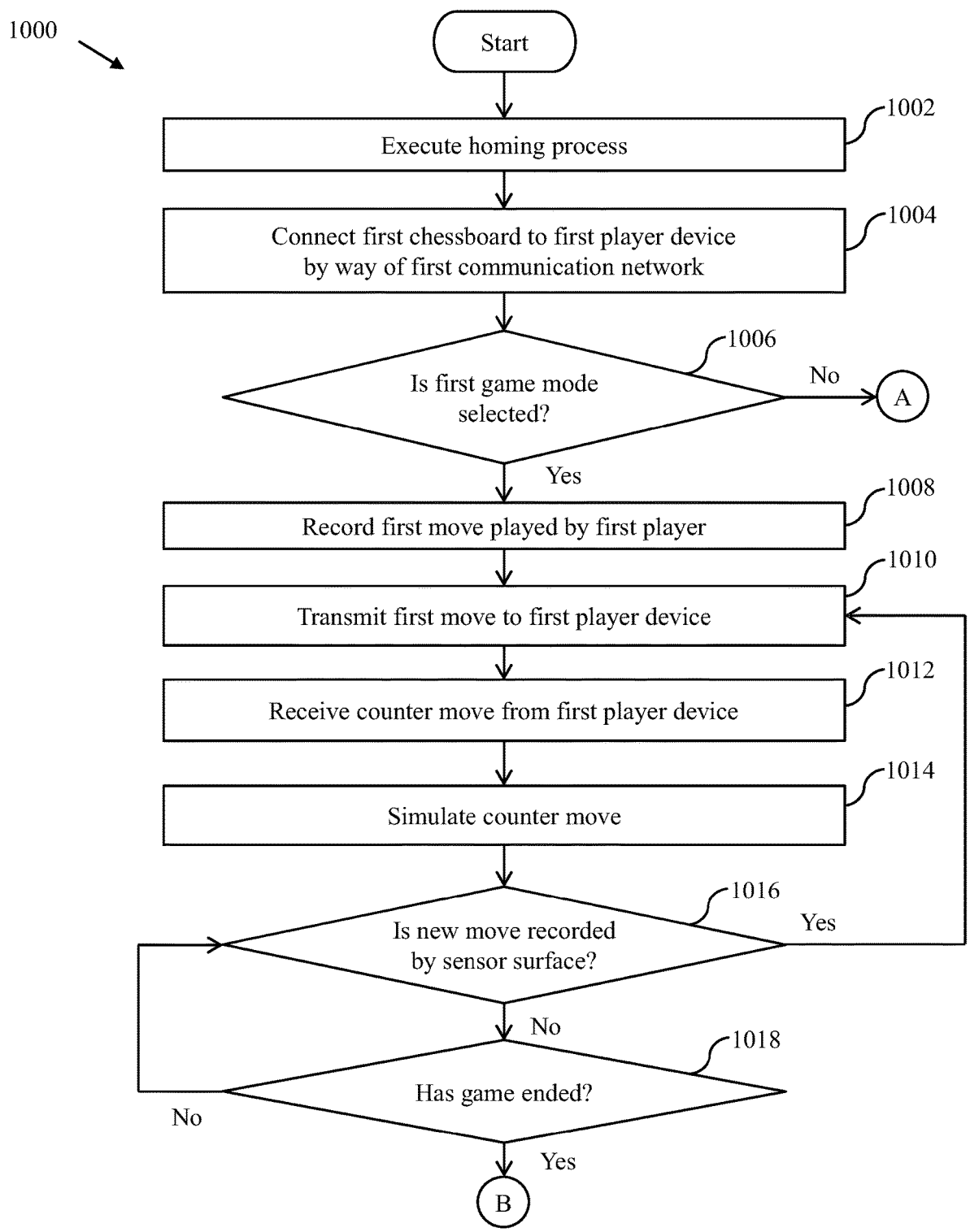
FIGS. 10A-10C, collectively, is a flow chart illustrating a method for playing a board game on the first game board, in accordance with an embodiment of the disclosure.
Figure 10B:
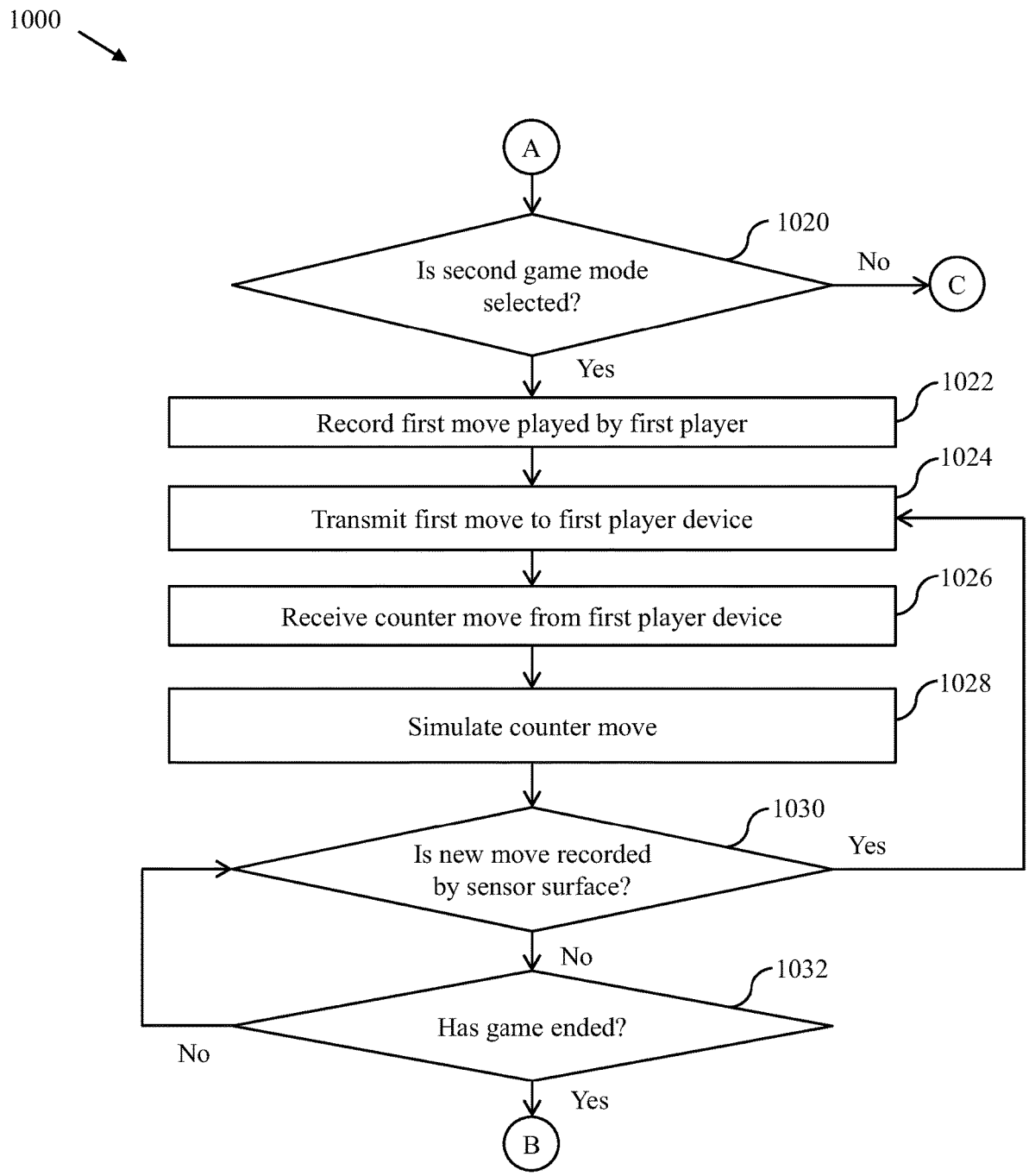
Figure 10C:
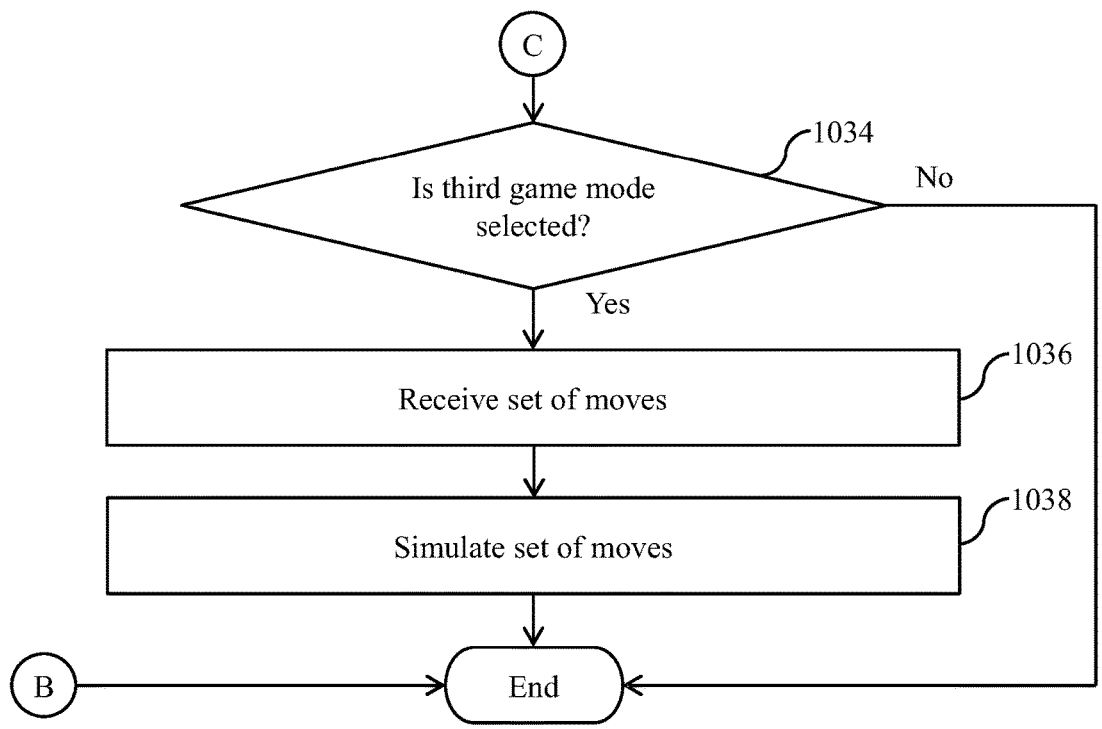

FIGS. 10A-10C, collectively, is a flow chart 1000 illustrating a method for playing the board game on the first game board 106a, in accordance with an embodiment of the disclosure. To initiate the board game (i.e., chess), the first player 102a switches on the first game board 106a by way of the switch 206. The motherboard 304 is powered ON by way of the battery 306 or the external power supply circuit (i.e., a DC power supply or an AC power supply).

Referring now to FIG. 10A, at step 1002, the motherboard 304 executes the homing process. At step 1004, the motherboard 304 connects the first game board 106a to the first player device 104a by way of the first communication network 110a. The first player 102a is presented with the first UI 902 on the first player device 104a. The first UI 902 includes the first through third game modes that are selectable by the first player 102a.

At step 1006, the motherboard 304 determines whether the first game mode is selected by the first player 102a. If at step 1006, the motherboard 304 determines that the first game mode is selected by the first player 102a, the game begins and step 1008 is executed. The first player 102a plays a move (such as the first move) on the first game board 106a. For the sake of ongoing discussion, it is assumed that the first player 102a plays a valid move. At step 1008, the motherboard 304 records the first move played by the first player 102a, by way of the sensor surface 302. At step 1010, the motherboard 304 transmits the first move to the first player device 104a by way of the first communication network 110a. The first player device 104a communicates the first move to the second player device 104b. In an embodiment, the second player device 104b communicates the first move to the second game board 106b. The second game board 106b moves a corresponding game piece, using the robotic arm, from one position to another position based on the first move. In response to the first move, the second player 102b plays the counter move on the second game board 106b. The second game board 106b transmits the counter move to the motherboard 304 by way of the second and first player devices 104b and 104a. In another embodiment, the first move is displayed to the second player 102b on the second player device 104b. In response to the first move, the second player 102b plays the counter move on the second player device 104b. The second player device 104b transmits the counter move to the motherboard 304 by way of the first player device 104a.

At step 1012, the motherboard 304 receives the counter move from the first player device 104a. At step 1014, the motherboard 304 simulates the counter move. To simulate the counter move, the motherboard 304 transmits the control signals to the drive system 308. The drive system 308 moves a corresponding game piece using a robotic arm (such as the first robotic arm 406, the second robotic arm, or the third robotic arm) based on the control signals.

At step 1016, the motherboard 304 determines whether a new move is recorded by the sensor surface 302. The new move is played by the first player 102a on the first game board 106a. If at step 1016, the motherboard 304 determines that the new move is recorded by the sensor surface 302, step 1010 is executed. If at step 1016, the motherboard 304 determines that the new move is not recorded by the sensor surface 302, step 1018 is executed. At step 1018, the motherboard 304 determines whether the game has ended. If at step 1018, the motherboard 304 determines that the game has not ended, step 1016 is executed.

If at step 1006, the motherboard 304 determines that the first game mode is not selected by the first player 102a, step 1020 is executed. Referring now to FIG. 10B, at step 1020, the motherboard 304 determines whether the second game mode is selected by the first player 102a. If at step 1020, the motherboard 304 determines that the second game mode is selected by the first player 102a, step 1022 is executed. The game starts and the first player 102a plays the move (such as the first move) on the first game board 106a.

At step 1022, the motherboard 304 records the first move played by the first player 102a, by way of the sensor surface 302. At step 1024, the motherboard 304 transmits the first move to the first player device 104a by way of the first communication network 110a. The AI player on the first player device 104a analyzes the first move and generates the counter move based on the analysis of the first move. The first player device 104a transmits the counter move to the motherboard 304.

At step 1026, the motherboard 304 receives the counter move from the first player device 104a. At step 1028, the motherboard 304 simulates the counter move using the drive system 308. At step 1030, the motherboard 304 determines whether a new move is recorded by the sensor surface 302. The new move may be played by the first player 102a on the first game board 106a. If at step 1030, the motherboard 304 determines that the new move is recorded by the sensor surface 302, step 1024 is executed. If at step 1030, the motherboard 304 determines that the new move is not recorded by the sensor surface 302, step 1032 is executed. At step 1032, the motherboard 304 determines whether the game has ended. If at step 1032, the motherboard 304 determines that the game has not ended, step 1030 is executed.

If at step 1020, the motherboard 304 determines that the second game mode is not selected by the first player 102a, step 1034 is executed. Referring now to FIG. 10C, at step 1034, the motherboard 304 determines whether the third game mode is selected by the first player 102a. If at step 1034, the motherboard 304 determines that the third game mode is selected by the first player 102a, step 1036 is executed. The service application or the server 108 renders the fifth UI 928 on the first player device 104a presenting the set of available matches to the first player 102a for selection. The first player 102a selects the match from the set of available matches for streaming. The selection of the match by the first player 102a is communicated to the server 108 by the first player device 104a. The server 108 transmits the set of moves associated with the selected match to the first player device 104a. The first player device 104a further transmits the set of moves to the motherboard 304. At step 1036, the motherboard 304 receives the set of moves from the first player device 104a. At step 1038, the motherboard 304 simulates the set of moves using the drive system 308.

The first game board 106a is a telerobotic game board that is capable of simulating moves of the second player 102b who is at a remote location as compared to the first player 102a and the first game board 106a. Hence, a need for the first player 102a to move the game pieces for an opponent player (i.e., the second player 102b) is eliminated. This relieves the first player 102a of the tiresome activity of moving the game pieces for the opponent player. Thus, the first player 102a is able to play with the second player 102b and simultaneously enjoy a physical experience of playing the board game. Further, the first game board 106a simulates the movement of the game pieces along the edges of the squares of the play area 202 and the first and second parking areas 204a. Hence, the movement of the game pieces simulated by the first game board 106a is performed in a manner without interfering with the positions of the other game pieces on the first and second game boards 106a and 106b. Additionally, the first game board 106a simulates the set of moves associated with the selected match. Thus, the first player 102a enjoys a physical experience of watching the selected match on the electronic game board.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure.

The invention claimed is:

1. A game board, comprising:
a top cover including at least a play area onto which a first plurality of game pieces are arranged to facilitate a game; and
a drive system located beneath the top cover and configured to simulate a move on the play area, wherein the simulation of the move includes a movement of at least one game piece, of the first plurality of game pieces, from a first position on the play area to a second position on the play area, and wherein the drive system includes:
a first actuator;
a base that houses the first actuator;
a robotic arm that includes a first link and a second link, wherein the first link is rotatably attached to the base, and wherein the second link is rotatably attached to the first link; and
a second actuator attached to the first link;
wherein the first actuator and the second actuator are configured to control movement of the first link and the second link, respectively, such that the first link is circularly rotatable with respect to the base, and the second link is circularly rotatable with respect to the first link, and wherein to simulate the move, the first actuator and the second actuator control the movement of the robotic arm such that the game piece is moved from the first position to the second position by way of the robotic arm.

2. The game board of claim 1, wherein the simulated move corresponds to at least one of a move played by a player located remotely with respect to the game board, a move played by an artificial intelligence player, or a move associated with a match of the game.

3. The game board of claim 1, wherein the top cover further includes one or more parking areas onto which a second plurality of game pieces are arranged, wherein the second plurality of game pieces correspond to game pieces, from the first plurality of game pieces, that are eliminated from the game, and wherein each of the second plurality of game pieces is moved from the play area to a corresponding parking area, of the one or more parking areas, by way of the robotic arm.

4. The game board of claim 1, further including a processor configured to:
generate a set of control signals to simulate the move on the play area; and
communicate the set of control signals to the drive system, wherein the movement of the robotic arm is controlled based on the set of control signals.

5. The game board of claim 1, wherein the robotic arm includes a magnet that moves the game piece from the first position to the second position.

* * * * *